United States Patent
Fukusako et al.

(10) Patent No.: US 6,827,062 B2
(45) Date of Patent: Dec. 7, 2004

(54) IGNITION TIMING CONTROL APPARATUS FOR INTERNAL COMBUSTION ENGINE

(75) Inventors: Takaaki Fukusako, Wako (JP); Mikio Fujiwara, Wako (JP); Jiro Takagi, Wako (JP)

(73) Assignee: Honda Motor Co., Ltd., Tokyo (JP)

(*) Notice: Subject to any disclaimer, the term of this patent is extended or adjusted under 35 U.S.C. 154(b) by 0 days.

(21) Appl. No.: 10/776,306

(22) Filed: Feb. 12, 2004

(65) Prior Publication Data

US 2004/0163623 A1 Aug. 26, 2004

(30) Foreign Application Priority Data

Feb. 21, 2003 (JP) ........................................ 2003-043544

(51) Int. Cl.$^7$ ............................................. F02P 5/152
(52) U.S. Cl. .............................. 123/406.33; 123/406.48
(58) Field of Search ............................ 123/406.33, 332, 123/333, 334, 335, 481, 406.21, 406.48

(56) References Cited

U.S. PATENT DOCUMENTS

| | | | | |
|---|---|---|---|---|
| 4,819,603 A | * | 4/1989 | Morita et al. | 123/406.33 |
| 5,038,736 A | * | 8/1991 | Ohkumo et al. | 123/406.33 |
| 6,240,900 B1 | * | 6/2001 | Thomas et al. | 123/406.21 |
| 6,247,448 B1 | * | 6/2001 | Scholl et al. | 123/406.33 |
| 6,581,570 B2 | * | 6/2003 | Franke et al. | 123/406.21 |

FOREIGN PATENT DOCUMENTS

JP 2844418 10/1998

* cited by examiner

*Primary Examiner*—Erick Solis
(74) *Attorney, Agent, or Firm*—Arent Fox PLLC

(57) ABSTRACT

An ignition timing control apparatus for an internal combustion engine having a plurality of cylinders, wherein operation of the engine is switchable between a partial-cylinder operation, which operates some of the cylinders, and an all-cylinder operation, which operates all of the cylinders. Basic ignition timing is calculated according to an operating condition of the engine. Knocking is determined based on an output of the knock sensor. A correction amount of the ignition timing is calculated according to a result of the knocking determination to suppress knocking, and the basic ignition timing is corrected with the calculated correction amount. Learning values of the correction amount are calculated corresponding, respectively, to partial-cylinder operation and all-cylinder operation, and one of the calculated learning values is used according to the operating condition of the engine.

18 Claims, 17 Drawing Sheets

IGNITION TIMING CONTROL APPARATUS FOR INTERNAL COMBUSTION ENGINE

BACKGROUND OF THE INVENTION

1. Field of the Invention

The present invention relates to an ignition timing control apparatus for an internal combustion engine, and more particularly to an ignition timing control apparatus for an internal combustion engine having a plurality of cylinders, wherein operation of the engine is switchable between partial-cylinder operation, which operates some of the cylinders, and all-cylinder operation, which operates all of the cylinders.

2. Description of the Related Art

An exemplary ignition timing control apparatus that determines whether knocking has occurred in an internal combustion engine based on an output signal from a knock sensor and corrects the ignition timing according to a result of the knocking determination is disclosed in Japanese Patent Publication No. 2844418. According to the known ignition timing control apparatus, the octane of the fuel being used is estimated, and a learning value of the estimated octane is calculated according to a result of the knocking determination. Further, the estimated octane is initialized or updated, and the ignition timing is corrected according to the estimated octane.

In the conventional ignition timing control apparatus, partial-cylinder operation of an internal combustion engine is not taken into account. Therefore, if the conventional ignition timing control apparatus is directly applied to control the ignition timing of the engine that is switchable between partial-cylinder operation and all-cylinder operation, then several problems arise.

When the combustion condition in the operating cylinders in partial-cylinder operation is good, the learning value is updated in such a direction that the ignition timing is advanced. When the operation of the engine changes from partial-cylinder operation to all-cylinder operation and the combustion condition in those cylinders which have started to operate from the halted state, is not good, knocking is likely to occur if the learning value updated in partial-cylinder operation is applied.

SUMMARY OF THE INVENTION

It is an aspect of the present invention to provide an ignition timing control apparatus which appropriately controls the ignition timing of an internal combustion engine that is switchable between partial-cylinder operation and all-cylinder operation according to the result of knocking determination, thereby obtaining a maximum engine output within the range where knocking is suppressed.

In order to attain the above aspect, the present invention provides an ignition timing control apparatus for an internal combustion engine having a plurality of cylinders. The operation of the engine is switchable between partial-cylinder operation, which operates some of the cylinders, and all-cylinder operation, which operates all of the cylinders. The ignition timing control apparatus includes basic ignition timing calculating means, a knock sensor mounted on the engine, knocking determining means, correcting means, and learning value calculating means. The basic ignition timing calculating means calculates a basic ignition timing according to an operating condition of the engine. The knocking determining means determines whether knocking has occurred based on an output of the knock sensor. The correcting means calculates a correction amount according to a determined result from the knocking determining means to suppress knocking, and corrects the basic ignition timing with the calculated correction amount. The learning value calculating means calculates learning values of the correction amount calculated by the correcting means. Further, the learning value calculating means calculates the learning values corresponding, respectively, to partial-cylinder operation and all-cylinder operation, and the correcting means uses one of the learning values calculated by the learning value calculating means according to the operating condition of the engine.

Accordingly, the correction amount of the ignition timing is calculated according to a result of the knocking determination to suppress knocking, and the learning value of the correction amount is further calculated. The learning value is calculated corresponding, respectively, to partial-cylinder operation and all-cylinder operation. The calculated learning value is applied as the correction amount according to the engine operating condition. Therefore, in the transition state from partial-cylinder operation to all-cylinder operation or vice versa, a learning value suitable for the respective operating condition is applied to thereby obtain a maximum engine output within the range where knocking is suppressed.

Preferably, in all-cylinder operation, the learning value calculating means calculates a learning value to be applied in an operating condition where an exhaust gas recirculation is performed, when the exhaust gas recirculation is being performed, and calculates a learning value to be applied in an operating condition where the exhaust gas recirculation is not performed, when the exhaust gas recirculation is not being performed.

Preferably, the basic ignition timing calculating means calculates the basic ignition timing according to a number of operating cylinders of the engine.

Preferably, the correcting means uses one of the learning values as the correction amount when the learning value is updated by the learning value calculating means so that the ignition timing is advanced.

Preferably, the correcting means includes limit value calculating means to calculate a limit value of the correction amount using the learning values corresponding, respectively, to partial-cylinder operation and all-cylinder operation, and limiting means to limit the correction amount using the limit value calculated by the limit value calculating means.

Preferably, the knocking determining means includes noise level calculating means to calculate a noise level based on the output of the knock sensor, gain coefficient calculating means to calculate a gain coefficient according to a number of operating cylinders of the engine, and determination threshold calculating means to calculate a determination threshold by multiplying the noise level by the gain coefficient, wherein the knocking determining means determines that knocking has occurred when a maximum value of the output of the knocking sensor exceeds the determination threshold.

DETAILED DESCRIPTION OF THE PREFERRED EMBODIMENTS

Figure 1:
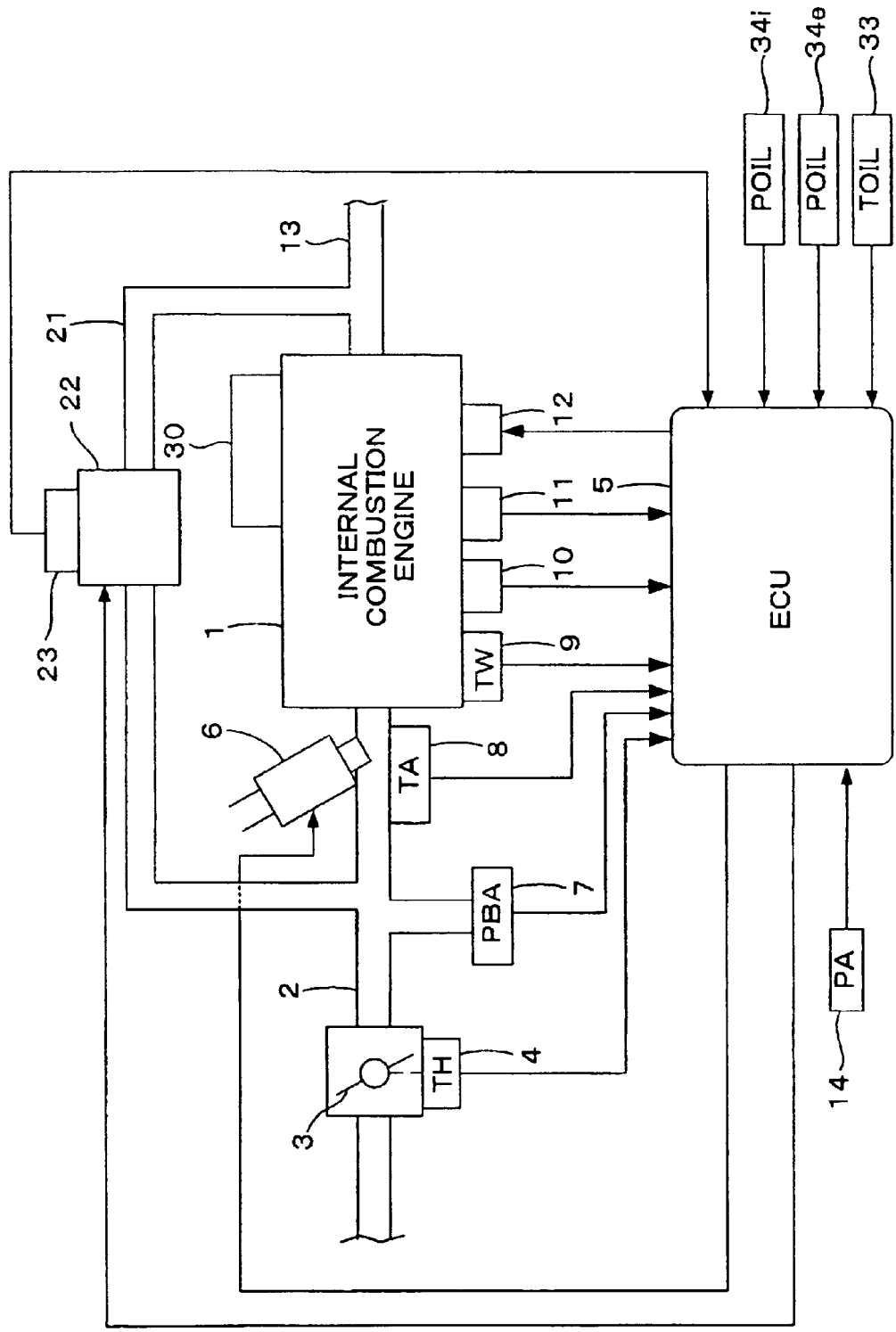
FIG. 1 is a schematic diagram of an internal combustion engine and a corresponding control system according to an embodiment of the present invention.
Figure 2:
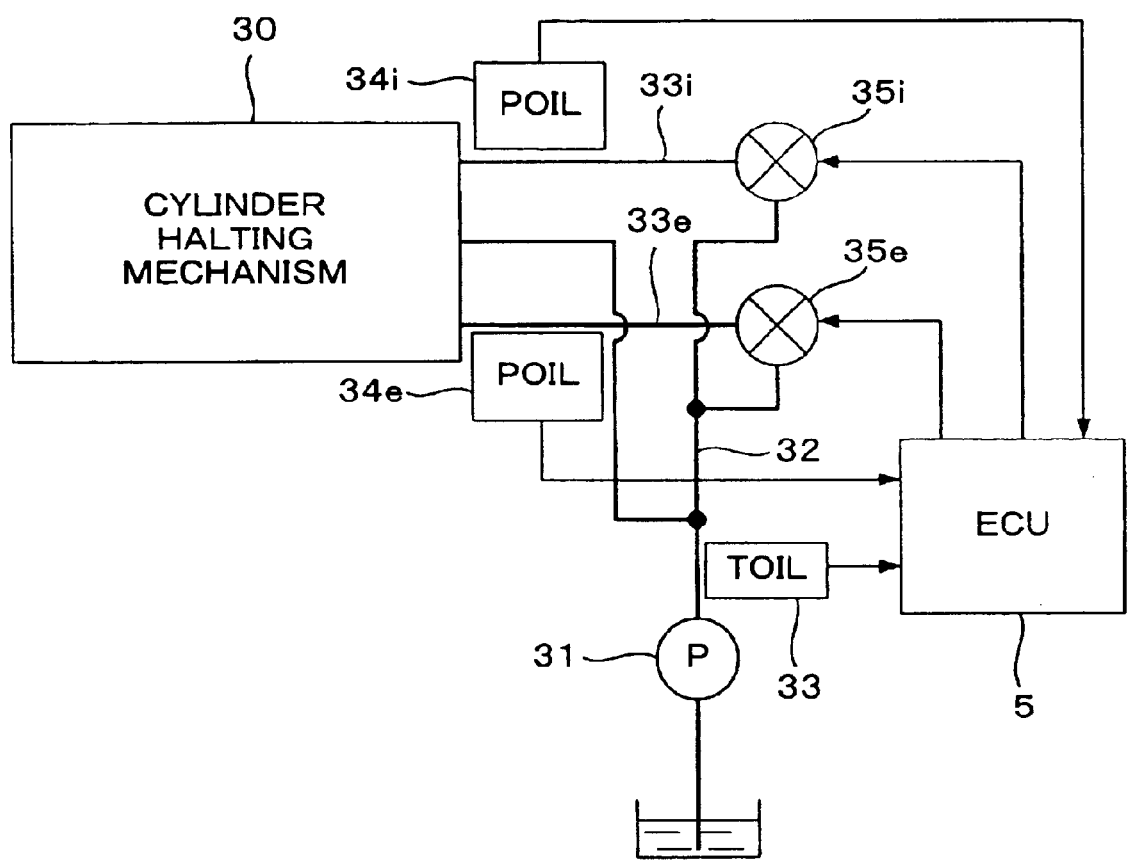
FIG. 2 is a schematic diagram of a hydraulic control system of a hydraulic circuit, which drives a cylinder halting mechanism.

FIG. 1 is a schematic diagram of an internal combustion engine and a corresponding control system according to an embodiment of the present invention. The engine 1, which may be, for example only, a V-type six-cylinder internal combustion engine but is hereinafter referred to simply as "engine", has a right bank provided with cylinders #1, #2, and #3 and a left bank provided with cylinders #4, #5, and #6. The right bank is further provided with a cylinder halting mechanism 30, which temporarily halts operation of cylinders #1 to #3. FIG. 2 is a schematic diagram of a hydraulic circuit for hydraulically driving the cylinder halting mechanism 30 and a control system for the hydraulic circuit. FIG. 2 will be referred to in conjunction with FIG. 1.

The engine 1 has an intake pipe 2 provided with a throttle valve 3. The throttle valve 3 is provided with a throttle valve opening sensor 4, which detects the throttle valve 3 is open TH. A detection signal output from the throttle opening sensor 4 is supplied to an electronic control unit, which is hereinafter referred to as ECU 5.

Fuel injection valves 6, for respective cylinders, are inserted into the intake pipe 2 at locations intermediate the engine 1 and the throttle valve 3, and slightly upstream of respective intake valves (not shown). Each fuel injection valve 6 is connected to a fuel pump (not shown) and electrically connected to the ECU 5. A valve opening period of each fuel injection valve 6 is controlled by a signal from the ECU 5.

An absolute intake pressure (PBA) sensor 7 is provided immediately downstream of the throttle valve 3 and detects a pressure in the intake pipe 2. An absolute pressure signal converted to an electrical signal by the absolute intake pressure sensor 7 is supplied to the ECU 5. An intake air temperature (TA) sensor 8 is provided downstream of the absolute intake pressure sensor 7 and detects an intake air temperature TA. An electrical signal corresponding to the detected intake air temperature TA is output from the sensor 8 and supplied to the ECU 5.

An engine coolant temperature (TW) sensor 9 such as, for example only, a thermistor, is mounted on the body of the engine 1 and detects an engine coolant temperature, i.e., a cooling water temperature, TW. A temperature signal corresponding to the detected engine coolant temperature TW is output from the sensor 9 and supplied to the ECU 5.

A crank angle position sensor 10 detects a rotational angle of the crankshaft (not shown) of the engine 1 and is connected to the ECU 5. A signal corresponding to the detected rotational angle of the crankshaft is supplied to the ECU 5. The crank angle position sensor 10 includes a cylinder discrimination sensor which outputs a pulse at a predetermined crank angle position for a specific cylinder of the engine 1, the pulse hereinafter is referred to as "CYL pulse". The crank angle position sensor 10 also includes a top dead center (TDC) sensor which outputs a TDC pulse at a crank angle position before a TDC of a predetermined crank angle starts at an intake stroke in each cylinder, i.e., at every 120 deg crank angle in the case of a six-cylinder engine, and a constant crank angle (CRK) sensor for generating one pulse with a CRK period, e.g., a period of 30 deg, shorter than the period of generation of the TDC pulse, the pulse hereinafter is referred to as "CRK pulse". The CYL pulse, the TDC pulse, and the CRK pulse are supplied to the ECU 5. The CYL, TDC, and CRK pulses are used to control the various timings, such as a fuel injection timing and an ignition timing, and to detect an engine rotational speed NE.

The cylinder halting mechanism 30 is hydraulically driven using lubricating oil of the engine 1 as operating oil. The operating oil, which is pressurized by an oil pump 31, is supplied to the cylinder halting mechanism 30 via an oil passage 32, an intake side oil passage 33$i$, and an exhaust side oil passage 33$e$. An intake side solenoid valve 35$i$ is provided between the oil passage 32 and the intake side oil passage 33$i$, and an exhaust side solenoid valve 35$e$ is provided between the oil passage 32 and the exhaust side oil passage 33$e$. The intake and exhaust side solenoid valves 35$i$ and 35$e$, respectively, are connected to the ECU 5 so operation of the solenoid valves 35$i$ and 35$e$ is controlled by the ECU 5.

Hydraulic switches 34$i$ and 34$e$, which are turned on when the operating oil pressure drops to a pressure lower than a predetermined threshold value, are provided, respectively, for the intake and exhaust side oil passages 33$i$ and 33$e$. Detection signals of the hydraulic switches 34$i$ and 34$e$ are supplied to the ECU 5. An operating oil temperature sensor 33, which detects an operating oil temperature TOIL, is provided in the oil passage 32, and a detection signal of the operating oil temperature sensor 33 is supplied to the ECU 5.

An exemplary configuration of a cylinder halting mechanism is disclosed in Japanese Patent Laid-open No. Hei 10-103097, and a similar cylinder halting mechanism is used as the cylinder halting mechanism 30 of the present invention. According to the cylinder halting mechanism 30, when the solenoid valves 35$i$ and 35$e$ are closed and the operating oil pressures in the oil passages 33$i$ and 33$e$ are low, the intake valves and the exhaust valves of the cylinders, i.e., #1 to #3, perform normal opening and closing movements.

However, when the solenoid valves 35i and 35e are open and the operating oil pressures in the oil passages 33i and 33e are high, the intake valves and the exhaust valves of the cylinders, i.e., #1 to #3, maintain their closed state. In other words, while the solenoid valves 35i and 35e are closed, all-cylinder operation of the engine 1, in which all cylinders are operating, is performed, and if the solenoid valves 35i and 35e are opened, partial-cylinder operation, in which the cylinders #1 to #3 do not operate and only the cylinders #4 to #6 are operating, is performed.

An exhaust gas recirculation passage 21 extends between a portion of the intake pipe 2 downstream of the throttle valve 3 and an exhaust pipe 13. The exhaust gas recirculation passage 21 has an exhaust gas recirculation valve, hereinafter referred to as "EGR valve" 22, to control the amount of a recirculated exhaust gas. The EGR valve 22 includes a solenoid-operated valve, the opening of the valve being controlled by the ECU 5. The EGR valve 22 is combined with a lift sensor 23 to detect its valve opening, i.e., valve lift, LACT, and supplies a detection signal to the ECU 5. The exhaust gas recirculation passage 21 and the EGR valve 22 jointly form an exhaust gas recirculation mechanism.

A spark plug 12 is provided in each cylinder of the engine 1. Each spark plug 12 is connected to the ECU 5, and a drive signal for each spark plug 12, i.e., an ignition signal, is supplied from the ECU 5.

A knock sensor 11, which detects high-frequency vibrations, is mounted on the engine 1 at a suitable position, and a detection signal output from the knock sensor 11 is supplied to the ECU 5. An atmospheric pressure sensor 14, which detects an atmospheric pressure PA, is connected to the ECU 5, and supplies a detection signal to the ECU 5.

The ECU 5 includes an input circuit, a central processing unit, which is hereinafter referred to as "CPU", a memory circuit, and an output circuit. The input circuit performs numerous functions, including, but not limited to, shaping the waveforms of input signals from the various sensors, correcting the voltage levels of the input signals to a predetermined level, and converting analog signal values into digital signal values. The memory circuit preliminarily stores various operating programs to be executed by the CPU and stores the results of computations or the like by the CPU. The output circuit supplies drive signals to the fuel injection valves 6. The ECU 5 controls the valve opening period of each fuel injection valve 6, the ignition timing, and the opening of the EGR valve 22 according to the detection signals from the various sensors. The ECU 5 further operates the intake and exhaust side solenoid valves 35i and 35e to perform switching control between all-cylinder operation and partial-cylinder operation of the engine 1.

The ECU 5 further performs knocking determination based on the output signal from the knock sensor 11 to correct the ignition timing according to the result of the knocking determination.

Figure 3:
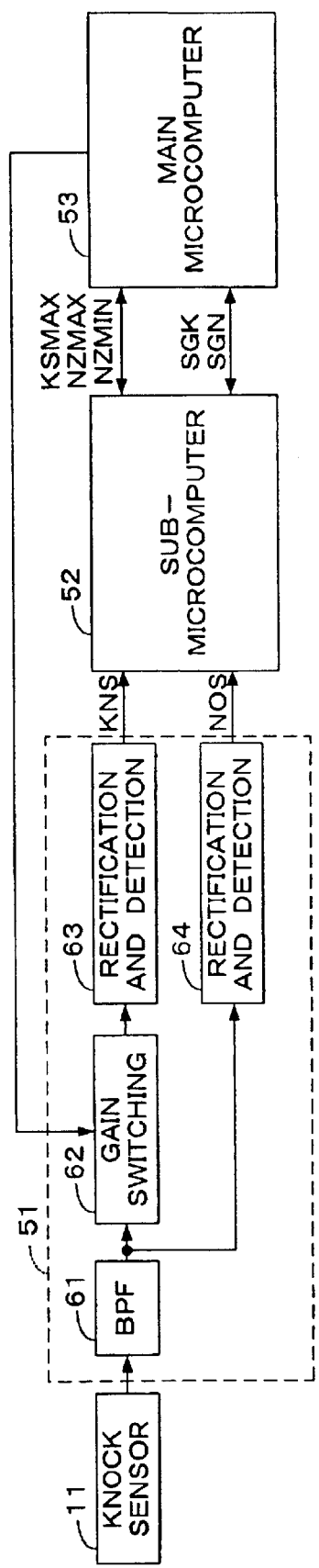
FIG. 3 is a schematic diagram of a knocking determination circuit.
Figure 4:
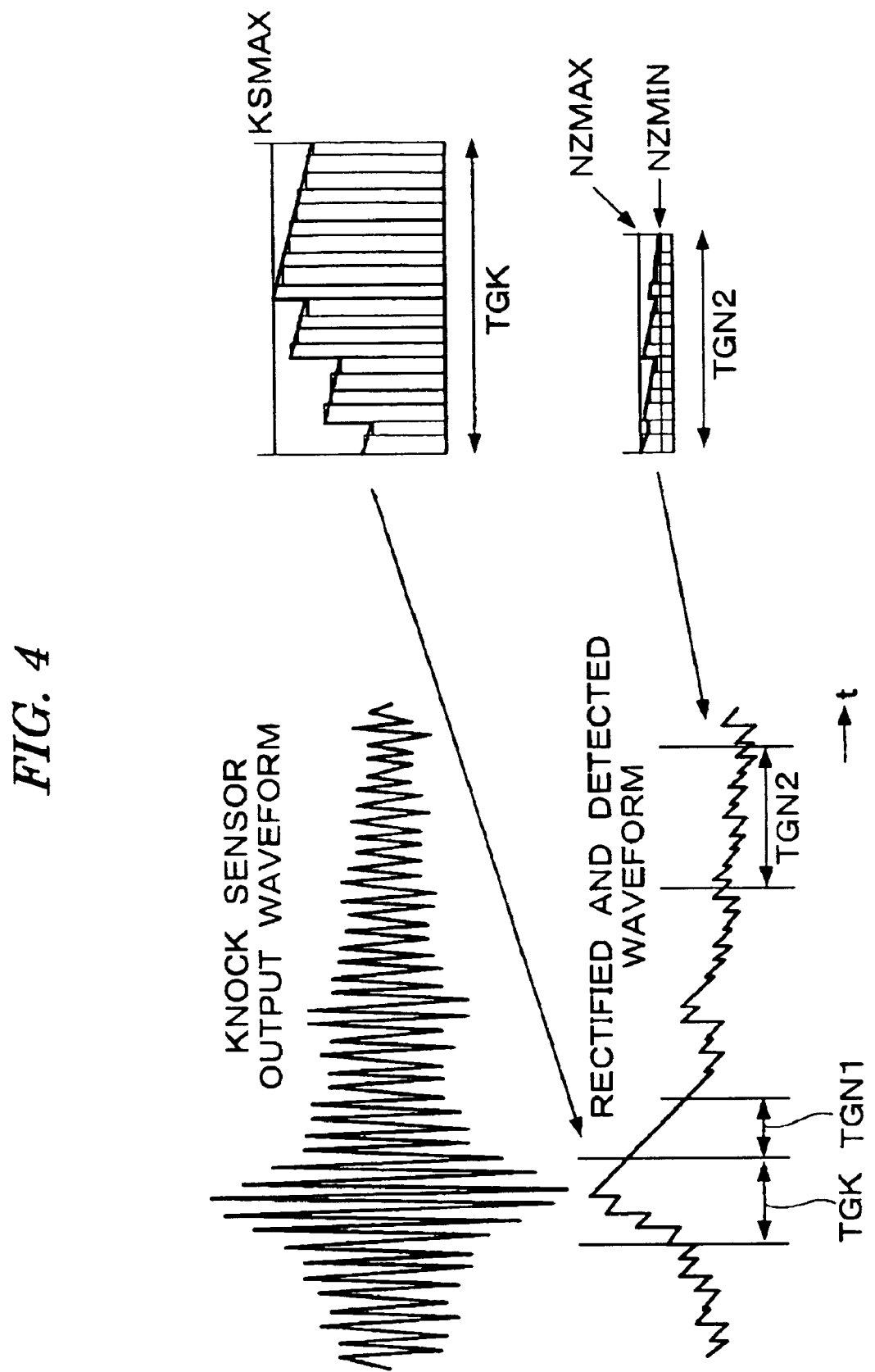
FIG. 4 is a waveform diagram illustrating a knocking determination process.

FIG. 3 is a schematic diagram of a knocking determination circuit arrangement according to an embodiment of the present invention. FIG. 4 is a signal waveform diagram illustrating a knocking determination process. FIG. 4 will also be referred to in the description below.

The knocking determination circuit includes an analog circuit section 51, a sub-microcomputer 52, and a main microcomputer 53. In the present embodiment, a resonance type knock sensor is used as the knock sensor 11.

The analog circuit section 51 includes a bandpass filter 61, a gain switching circuit 62, and a pair of rectification and detection circuits 63 and 64. An output from the knock sensor 11, as shown in the knock sensor output waveform of FIG. 4, is input through the bandpass filter 61 to the gain switching circuit 62 and then the rectification and detection circuit 64. The gain switching circuit 62 is switched by a control signal from the main microcomputer 53 wherein the gain decreases ½ times in the high-speed rotational region of the engine 1 and increases four times in the low-speed rotational region of the engine 1. An output signal from the gain switching circuit 62 is input to the rectification and detection circuit 63.

The rectification and detection circuit 63 inputs a signal KNS for detection of a knock level to the sub-microcomputer 52, and the rectification and detection circuit 64 inputs a signal NOS for detection of a noise level to the sub-microcomputer 52 as shown in the rectified and detected waveform of FIG. 4. The sub-microcomputer 52 performs an A/D converting function, and detects a maximum value of the signal KNS during a knock gate period TGK, see FIG. 4, as a knock level KSMAX. The sub-microcomputer 52 further detects a maximum value NZMAX and a minimum value NZMIN during noise gate periods TGN1 and TGN2. A knock gate signal SGK, which indicates the knock gate period TGK, and a noise gate signal SGN, which indicates the noise gate periods TGN1 and TGN2, are supplied from the main microcomputer 53 to the sub-microcomputer 52.

Figure 5:
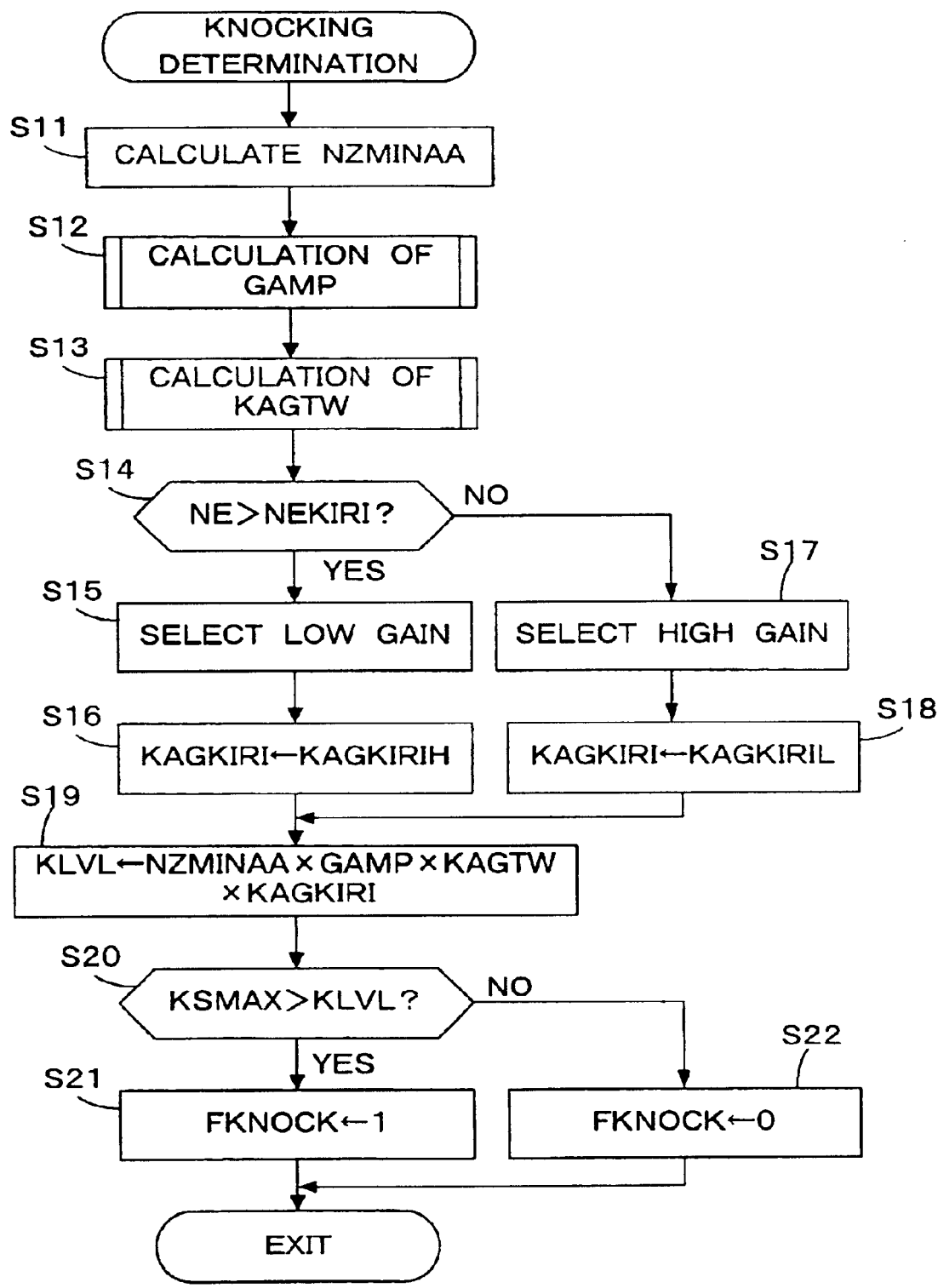
FIG. 5 is a flowchart illustrating a knocking determination process executed by a main microcomputer.

The main microcomputer 53 generates the knock gate signal SGK and the noise gate signal SGN according to the TDC and CRK pulses, and executes the knocking determination process illustrated in FIG. 5.

FIG. 5 is a flowchart illustrating a knocking determination process, which is executed by the main microcomputer 53 during generation of a TDC pulse.

In step S11, a noise level NZMINAA(n) is calculated according to the equation (1)

$$NZMINAA(n)=[NZMINAA(n-3)+NZMINAA(n-2)+NZMINAA(n-1)+NZMIN(n)]/4 \quad (1)$$

where NZMINAA(n−3) to NZMINAA(n−1) are past values of the noise level, and NZMIN(n) is a latest detected minimum value of the noise level transmitted from the sub-microcomputer 52.

Figure 6:
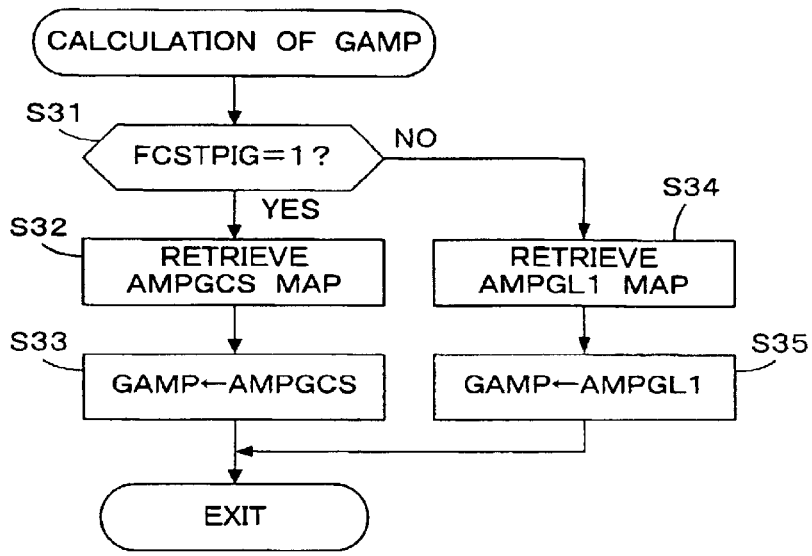
FIG. 6 is a flowchart illustrating a process to calculate a gain coefficient (GAMP) used in the knocking determination.

In step S12, a gain coefficient (GAMP) calculation process illustrated in FIG. 6 is executed to calculate a GAMP.

In step S31 of FIG. 6, it is determined whether a cylinder halt flag FCSTPIG is "1". The cylinder halt flag FCSTPIG is set to "1" when partial-cylinder operation is performed to halt the cylinders #1 to #3. If the answer to step S31 is negative (NO), which indicates all-cylinder operation is being performed, an AMPGL1 map (not shown) is retrieved according to the engine rotational speed NE and the absolute intake pressure PBA to calculate a first map value AMPGL1 (step S34). The AMPGL1 map is set so the first map value AMPGL1 increases with an increase in the engine rotational speed NE and an increase in the absolute intake pressure PBA. In step S35, the gain coefficient GAMP is set to the first map value AMPGL1. Then, the process of FIG. 6 ends.

If the answer to step S31 is affirmative (YES), which indicates partial-cylinder operation is being performed, an AMPGCS map (not shown) is retrieved according to the engine rotational speed NE and the absolute intake pressure PBA to calculate a second map value AMPGCS (step S32). The AMPGCS map is set so the second map value AMPGCS increases with an increase in the engine rotational speed NE and an increase in the absolute intake pressure PBA. Further, the second map value AMPGCS is set smaller than the first map value AMPGL1, when compared at the same engine rotational speed NE and at the same absolute intake pressure PBA.

In step S33, the gain coefficient GAMP is set to the second map value AMPGCS. Then, the process of FIG. 6 ends.

Figure 7:
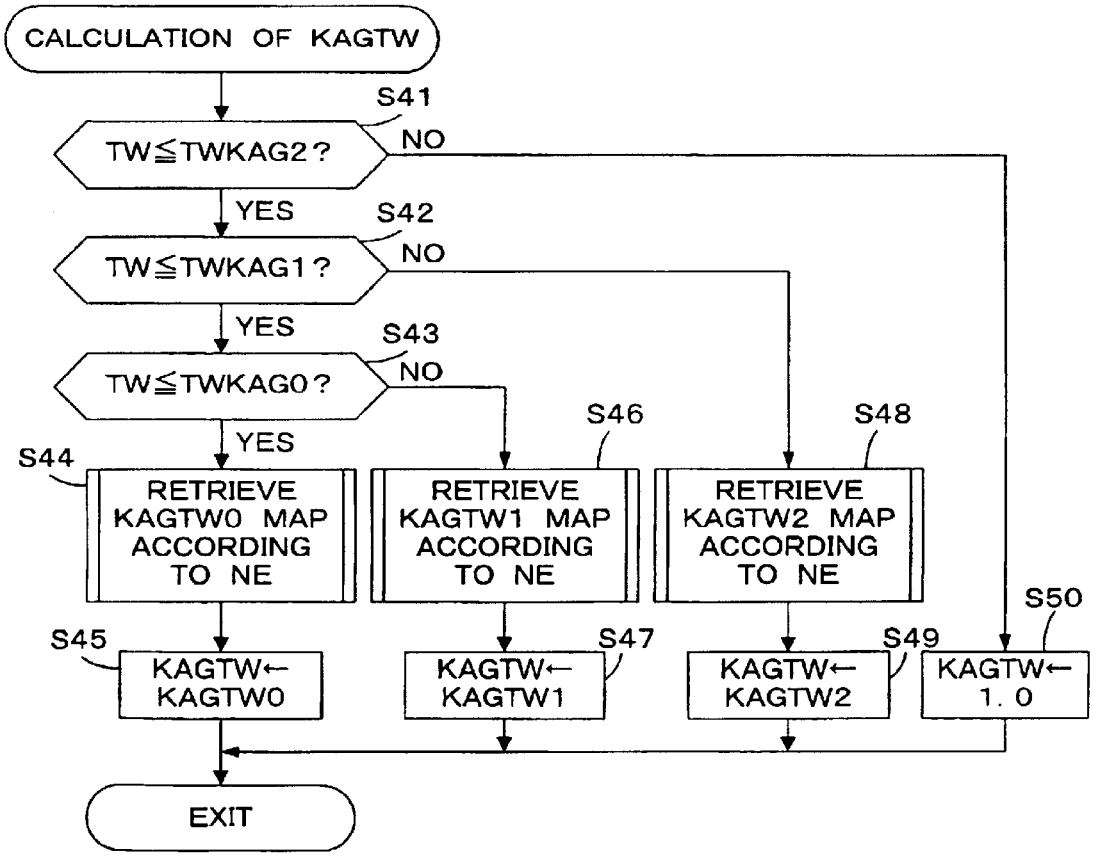
FIG. 7 is a flowchart illustrating a process to calculate a correction coefficient (KAGTW) of a determination threshold used in the knocking determination.

Referring back to FIG. 5, in step S13, a correction coefficient (KAGTW) calculation process illustrated in FIG. 7 is executed to calculate a KAGTW.

In step S41 of FIG. 7, it is determined whether the engine coolant temperature TW is less than or equal to a third predetermined water temperature TWKAG2, e.g., 70° C. If TW is greater than TWKAG2, the correction coefficient KAGTW is set to "1.0" (noncorrective value) (step S50).

Figure 8:
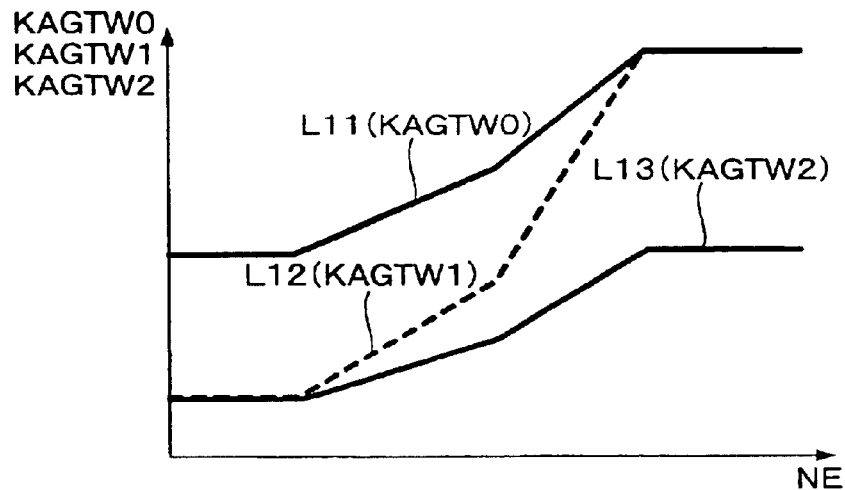
FIG. 8 is a graph chart used in the correction coefficient calculation process of FIG. 7.

If TW is less than or equal to TWKAG2 in step S41, it is determined whether the engine coolant temperature TW is less than or equal to a second predetermined water temperature TWKAG1, e.g., 60° C., which is lower than the third predetermined water temperature TWKAG2 (step S42). If the answer to step S42 is negative (NO), that is, if TW is greater than TWKAG1 and less than or equal to TWKAG2, a KAGTW2 table (solid line L13) illustrated in FIG. 8 is retrieved according to the engine rotational speed NE to calculate a third coefficient value KAGTW2 (step S48). The KAGTW2 table is set so the third coefficient value KAGTW2 increases with an increase in the engine rotational speed NE. Thereafter, the correction coefficient KAGTW is set to the third coefficient value KAGTW2 (step S49).

If TW is less than or equal to TWKAG1 in step S42, it is determined whether the engine coolant temperature TW is less than or equal to a first predetermined water temperature TWKAG0, e.g., 40° C., which is lower than the second predetermined water temperature TWKAG1 (step S43). If the answer to step S43 is negative (NO), that is, if TW is greater than TWKAG0 and less than or equal to TWKAG1, a KAGTW1 table (broken line L12) illustrated in FIG. 8 is retrieved according to the engine rotational speed NE to calculate a second coefficient value KAGTW1 (step S46). The KAGTW1 table is set so the second coefficient value KAGTW1 increases with an increase in the engine rotational speed NE. Thereafter, the correction coefficient KAGTW is set to the second coefficient value KAGTW1 (step S47).

If TW is less than or equal to TWKAG0 in step S43, a KAGTW0 table (solid line L11) illustrated in FIG. 8 is retrieved according to the engine rotational speed NE to calculate a first coefficient value KAGTW0 (step S44). The KAGTW0 table is set so the first coefficient value KAGTW0 increases with an increase in the engine rotational speed NE. Thereafter, the correction coefficient KAGTW is set to the first coefficient value KAGTW0 (step S45).

According to the process of FIG. 7, the correction coefficient KAGTW is set to increase with a decrease in engine coolant temperature TW and with an increase in engine rotational speed NE.

Referring back to FIG. 5, in step S14, it is determined whether the engine rotational speed NE is higher than a gain switching speed NEKIRI, e.g., 2500 rpm. If NE is higher than NEKIRI, which indicates the engine 1 is being operated at a high speed, a control signal for setting a gain of the gain switching circuit 62 to a low gain is output (step S15), and a gain switching coefficient KAGKIRI is set to a high-speed predetermined value KAGKIRIH (step S16). Conversely, if NE is lower than or equal to NEKIRI in step S14, a control signal for setting a gain of the gain switching circuit 62 to a high gain is output (step S17), and the gain switching coefficient KAGKIRI is set to a low-speed predetermined value KAGKIRIL (step S18). The low-speed predetermined value KAGKIRIL is set to a value greater than the high-speed predetermined value KAGKIRIH.

In step S19, the noise level NZMINAA, the gain coefficient GAMP, the correction coefficient KAGTW, and the gain switching coefficient KAGKIRI are applied to the following equation (2) to calculate a determination threshold KLVL.

$$KLVL = NZMINAA \times GAMP \times KAGTW \times KAGKIRI \qquad (2)$$

In step S20, it is determined whether a maximum value KSMAX of the knock level is greater than the determination threshold KLVL. If KSMAX is greater than KLVL, it is determined that knocking has occurred, and a knocking flag FKNOCK is set to "1" (step S21). If KSMAX is less than or equal to KLVL, it is determined that no knocking has occurred, and the knocking flag FKNOCK is set to "0" (step S22).

Figure 9:
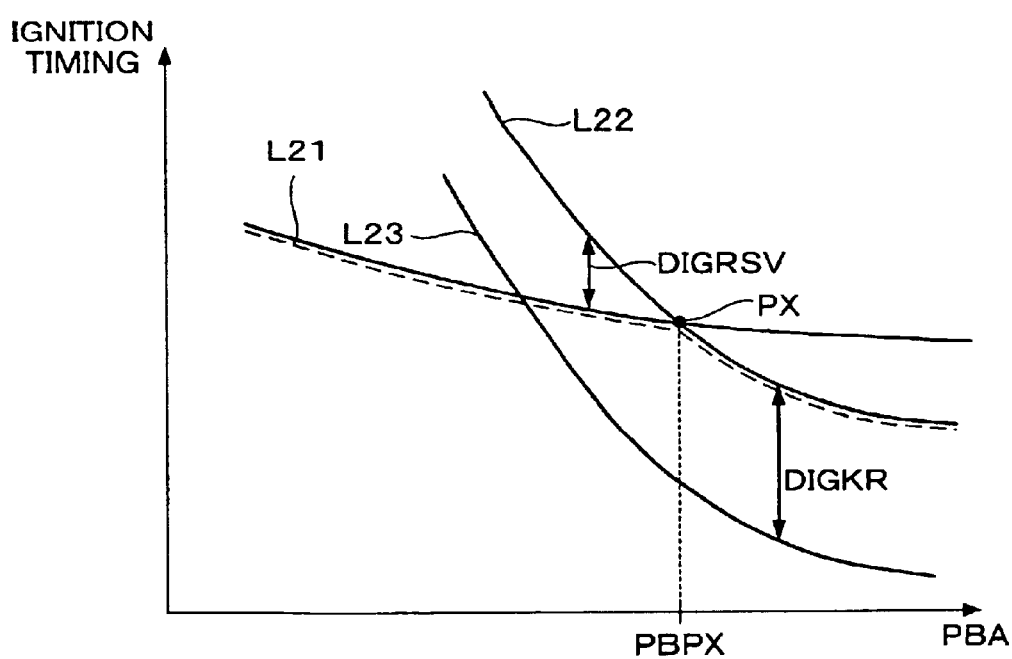
FIG. 9 is a graph chart illustrating ignition timing control.

Ignition timing control according to an embodiment of the present invention will be described below with reference to FIG. 9. In FIG. 9, a line L21 represents a minimum spark advance for best torque (MBT) to maximize an output torque of the engine 1, a line L22 represents a knock limit ignition timing IGRONH corresponding to a fuel having a high octane, e.g., an octane of 100, and a line L23 represents a knock limit ignition timing IGRONL corresponding to a fuel having a low octane, e.g., an octane of 90. The ignition timing is indicated by an advanced angle from the top dead center.

In an embodiment of the present invention, a basic ignition timing IGMAP corresponding to a fuel having a high octane is set in a map according to the engine rotational speed NE and the absolute intake pressure (PBA).

Specifically, as indicated by the broken-line curve in FIG. 9, the MBT corresponding to the curve L21 is set as the basic ignition timing IGMAP when the engine 1 is in a low-load operating condition, wherein the absolute intake pressure PBA is lower than a predetermined intake pressure PBPX corresponding to a point PX in FIG. 9. Further, the knock limit ignition timing IGRONH corresponding to the curve L22 is set as the basic ignition timing IGMAP when the engine 1 is operating in a high-load operating condition wherein the absolute intake pressure PBA is higher than the predetermined intake pressure PBPX.

The ignition timing IGCMD is calculated from the following equation (3).

$$IGCMD = IGMAP + IGCR \qquad (3)$$

where IGCR represents a correction term calculated by the following equation (4).

$$IGCR = DIGRSV + IGTW + IGPA - IGTA - IGKNOCK \qquad (4)$$

In equation (4), DIGRSV represents, as shown in FIG. 9, a low-load advancing correction term that is set to (IGRONH−MBT) in the low-load operating condition with respect to the point PX, and set to "0" in the high-load operating condition with respect to the point PX. IGTW represents a coolant temperature correction term that is set according to the engine coolant temperature TW. IGPA represents an atmospheric pressure correction term that is set according to the atmospheric pressure. IGTA represents an intake air temperature correction term that is set according to the intake air temperature TA. IGKNOCK represents a knock correction term that is calculated from the following equation (5).

$$IGKNOCK = DIGKR \times KIGKN \qquad (5)$$

In equation (5), DIGKR represents a difference, wherein the difference is hereinafter being referred to as "octane difference term," between the knock limit ignition timing IGRONH, which corresponds to a fuel having a high octane, and the knock limit ignition timing IGRONL, which corresponds to a fuel having a low octane. Further, KIGKN represents a retarding coefficient that is set according to a result of the knocking determination. When knocking occurs, the retarding coefficient KIGKN is updated in the increasing direction, i.e., the retarding direction, and when no knocking occurs, the retarding coefficient KIGKN is updated in the decreasing direction, i.e., the advancing direction.

Figure 10:
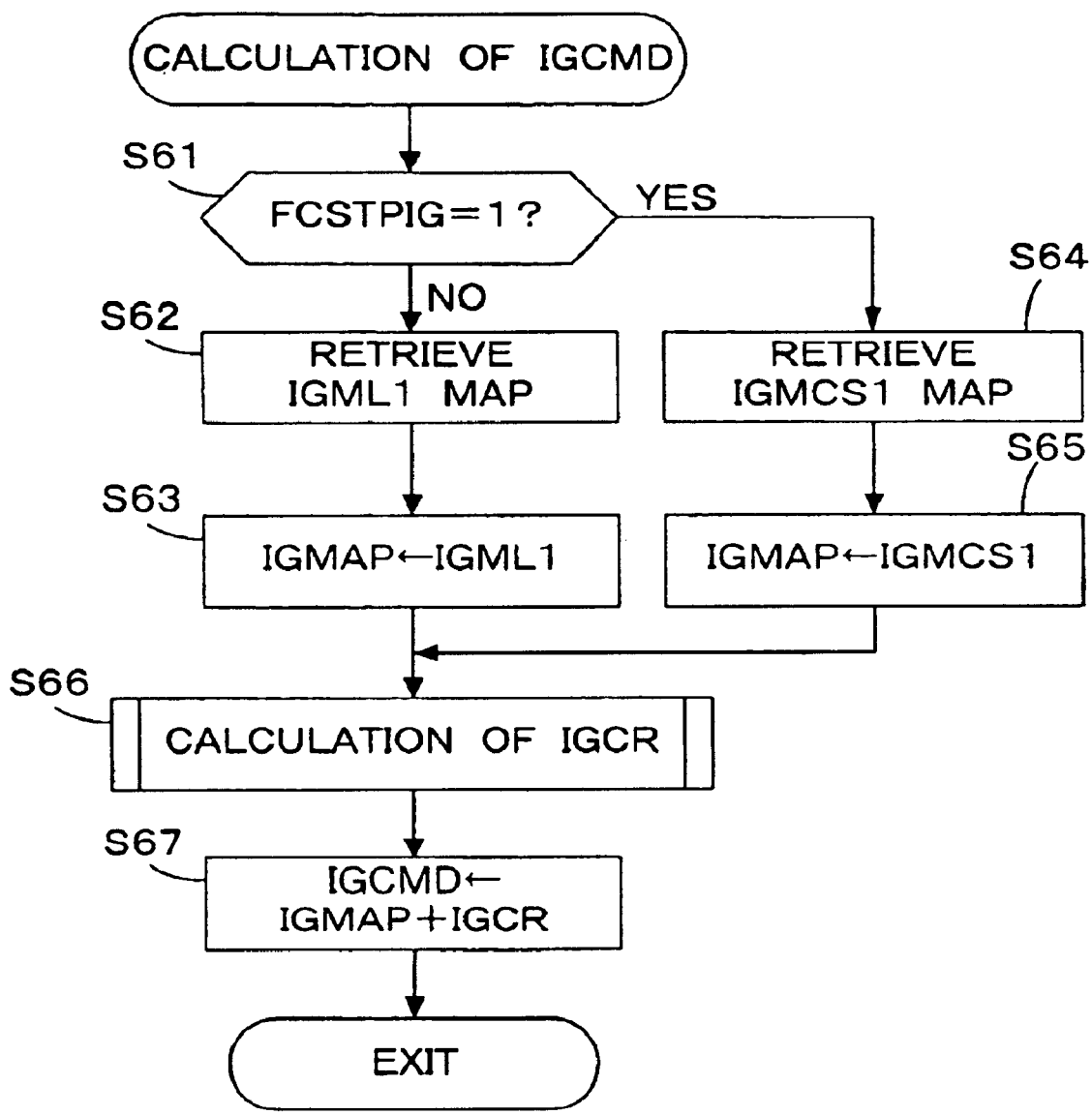
FIG. 10 is a flowchart illustrating an ignition timing (IGCMD) calculation process.

FIG. 10 is a flowchart illustrating an ignition timing IGCMD calculation process, which is executed by the main microcomputer 53 during generation of the TDC pulse.

In step S61, it is determined whether the cylinder halt flag FCSTPIG is "1". If the answer to step S61 is negative (NO), indicating that the engine 1 is in all-cylinder operation, then an IGML1 map (not shown) is retrieved according to the engine rotational speed NE and the absolute intake pressure PBA to calculate a first map value IGML1 (step S62). The IGML1 map is a basic ignition timing map for all-cylinder operation. As described above, the IGML1 map is set so the MBT corresponding to the line L21 is set as the first map value IGML1 for the low-load engine operating condition, wherein the absolute intake pressure PBA is lower than the predetermined intake pressure PBPX corresponding to the point PX in FIG. 9. Also, the knock limit ignition timing IGRONH corresponding to the line L22 is set as the first map value IGML1 for the high-load engine operating condition, wherein the absolute intake pressure PBA is higher than the predetermined intake pressure PBPX. In step S63, the basic ignition timing IGMAP is set to the first map value IGML1. Thereafter, the process proceeds to step S66.

If the answer to step S61 is affirmative (YES), indicating the engine 1 is in partial-cylinder operation, then an IGMCS1 map (not shown) is retrieved according to the engine rotational speed NE and the absolute intake pressure PBA to calculate a second map value IGMCS1 (step S64). The IGMCS1 map is a basic ignition timing map for partial-cylinder operation. As described above, the IGMCS1 map is set so the MBT corresponding the line L21 is set as the second map value IGMCS1 for the low-load engine operating condition, wherein the absolute intake pressure PBA is lower than the predetermined intake pressure PBPX corresponding to the point PX in FIG. 9. Likewise, the knock limit ignition timing IGRONH corresponding to the line L22 is set as the second map value IGMCS1 for the high-load engine operating condition, wherein the absolute intake pressure PBA is higher than the predetermined intake pressure PBPX.

In an embodiment of the present invention, two basic ignition timing maps, i.e., the basic ignition timing map for all-cylinder operation and the basic ignition timing map for partial-cylinder operation, are used because the volumetric efficiency (intake efficiency) $\eta V$ of the engine during all-cylinder operation and the volumetric efficiency $\eta V$ during partial-cylinder operation are different from each other.

In step S65, the basic ignition timing IGMAP is set to the second map value IGMCS1. Thereafter, the process proceeds to step S66.

Figure 11:
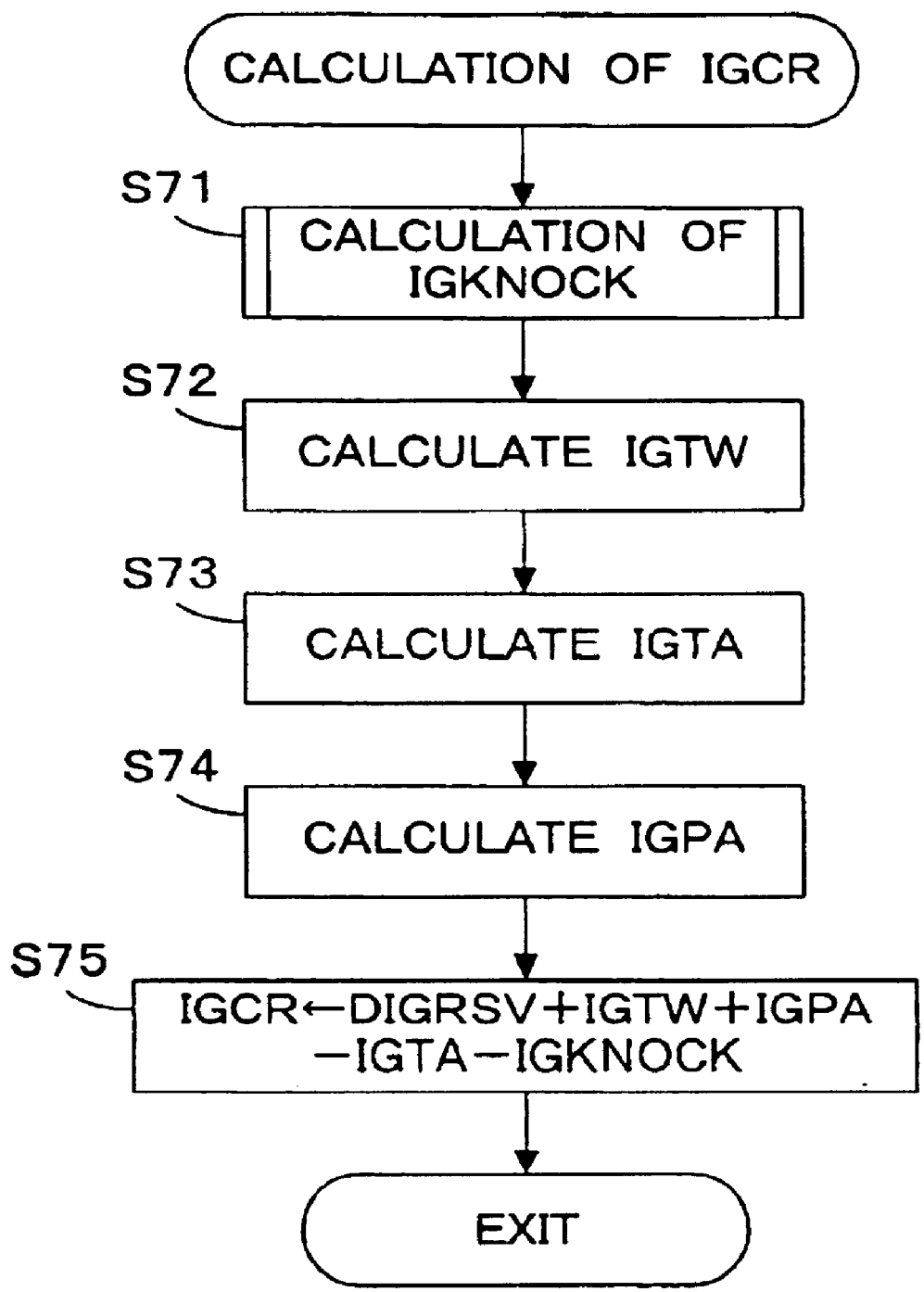
FIG. 11 is a flowchart illustrating a correction term (IGCR) calculation process for the ignition timing.

In step S66, an IGCR calculation process shown in FIG. 11 is executed to calculate a correction term IGCR. In step S67, an ignition timing IGCMD is calculated according to the above-described equation (3).

FIG. 11 is a flowchart of the IGCR calculation process executed in step S66 of FIG. 10.

Figure 12:
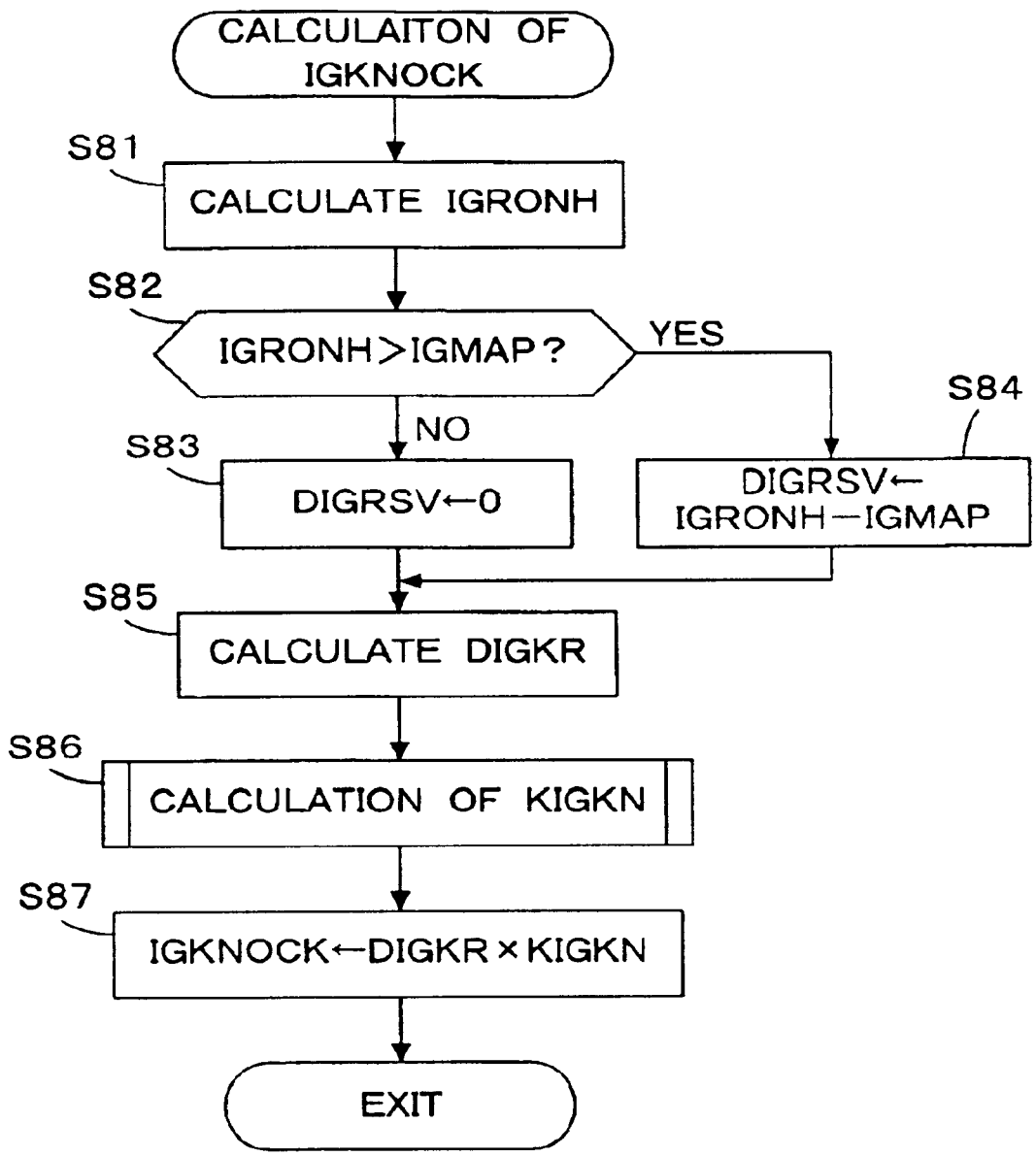
FIG. 12 is a flowchart illustrating a knock correction term (IGKNOCK) calculation process for the ignition timing.

In step S71, an IGKNOCK calculation process illustrated in FIG. 12 is executed to calculate a knock correction term IGKNOCK. In step S72, a coolant temperature correction term IGTW is calculated according to the engine coolant temperature TW. In step S73, an intake temperature correction term IGTA is calculated according to the intake temperature TA. In step S74, an atmospheric pressure correction term IGPA is calculated according to the atmospheric pressure PA.

In step S75, a correction term IGCR is calculated from the equation (4) shown above.

FIG. 12 is a flowchart of the IGKNOCK calculation process executed in step S71 of FIG. 11.

In step S81, an IGRONH map (not shown) is retrieved according to the engine rotational speed NE and the absolute intake pressure PBA to calculate a knock limit ignition timing IGRONH for a fuel having a high octane. Then, it is determined whether the knock limit ignition timing IGRONH is greater than the basic ignition timing IGMAP (step S82). If IGRONH is less than or equal to IGMAP, then the low-load ignition timing advancing correction term DIGRSV is set to "0" in step S83. If IGRONH is greater than IGMAP, then the low-load advancing correction term DIGRSV is calculated from the following equation (6).

$$DIGRSV=IGRONH-IGMAP \qquad (6)$$

In step S85, a DIGKR map (not shown) is retrieved according to the engine rotational speed NE and the absolute intake pressure PBA to calculate an octane number difference term DIGKR. In the DIGKR map, as shown in FIG. 9, a difference between the knock limit ignition timing IGRONH for a fuel having a high octane and the knock limit ignition timing IGRONL for a fuel having a low octane is set according to the engine rotational speed NE and the absolute intake pressure PBA.

Figure 13:
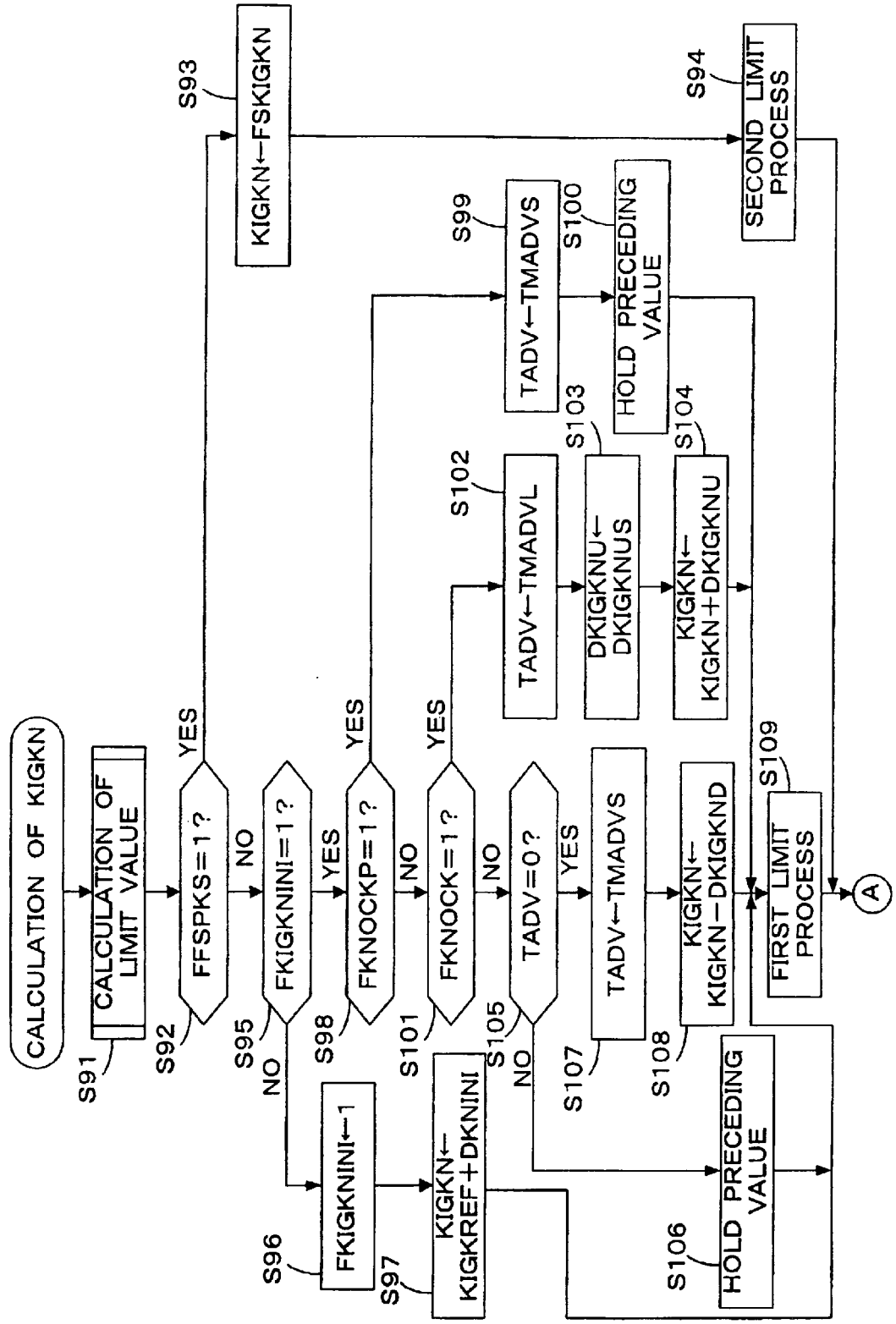
FIGS. 13 and 14 are flowcharts illustrating a retarding coefficient (KIGKN) calculation process.
Figure 14:
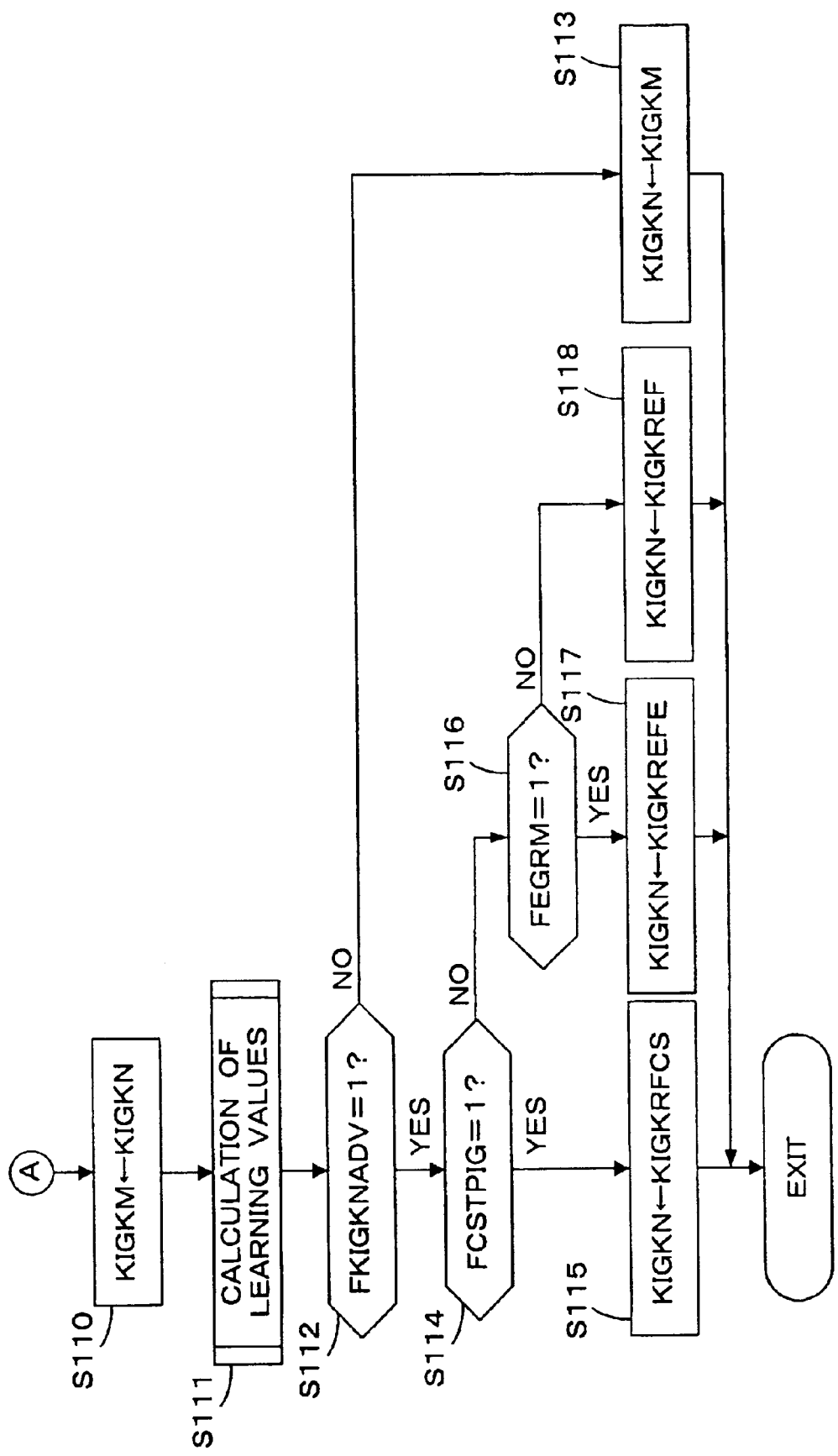

In step S86, a retarding coefficient KIGKN calculation process illustrated in FIGS. 13 and 14 is executed to calculate a retarding coefficient KIGKN. In step S87, an ignition timing knock correction term IGKNOCK is calculated from the equation (5) shown above.

FIGS. 13 and 14 are flowcharts of the KIGKN calculation process executed in step S86 of FIG. 12.

Figure 15:
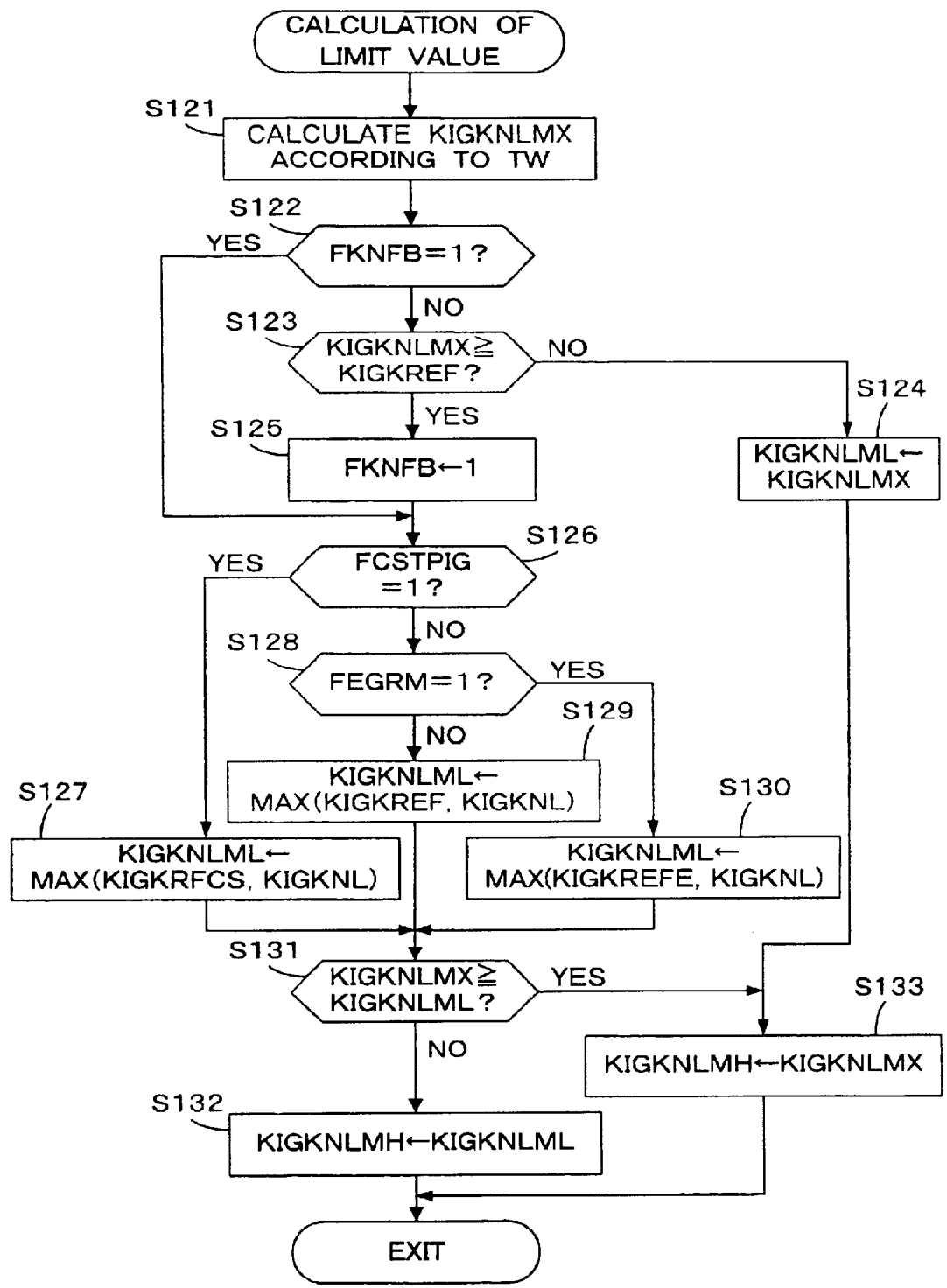
FIG. 15 is a flowchart illustrating a limit value calculation process for the retarding coefficient.

In step S91 of FIG. 13, a limit value calculation process, which is illustrated in FIG. 15, is executed to calculate an upper limit value KIGKNLMH and a lower limit value KIGKNLML for the retarding coefficient KIGKN. In step S92, it is determined whether a failure detection flag FFSPKS is "1". The failure detection flag FFSPKS is set to "1" when a failure of any one of the various sensors for detecting engine operating conditions, such as the absolute intake pressure sensor 7, the intake air temperature sensor 8, etc., is detected. If FFSPKS is equal to "1", which indicates a fail-safe operation is required, then the retarding coefficient KIGKN is set to a predetermined fail-safe value FSKIGKN in step S93, and a second limit process is executed in step S94. In the second limit process, if the retarding coefficient KIGKN exceeds the upper limit value KIGKNLMH, then the retarding coefficient KIGKN is reset to the upper limit value KIGKNLMH. After executing step S94, the process goes to step S110 of FIG. 14.

If FFSPKS is equal to "0" in step S92, which indicates that no fail-safe operation is required, then it is determined whether an initial flag FKIGKNINI is "1" in step S95. Since FKIGKNINI is initially "0", the process goes to step S96 in which the initial flag FKIGKNINI is set to "1". Then, the retarding coefficient KIGKN is calculated from the following equation (7).

$$KIGKN=KIGKREF+DKNINI \qquad (7)$$

where KIGKREF represents a first learning value of the retarding coefficient KIGKN calculated in a learning value calculation process described later, and DKNINI represents a predetermined initial preset additive value.

After executing step S97, the process goes to step S109.

After the initial flag FKIGKNINI is set to "1" in step S96, the process goes from step S95 to step S98 to determine whether a knock determination inhibiting flag FKNOCKP is "1". The knock determination inhibiting flag FKNOCKP is set to "1" when the engine rotational speed NE is low (e.g., lower than 1000 rpm) or when the engine is in a fuel-cut operation wherein the fuel supply to the engine is stopped. If the answer to step S98 is affirmative (YES), then a downcount timer TADV is set to a first predetermined time periods TMADVS (e.g., 0.2 second), and started in step S99. Then, the retarding coefficient KIGKN is set to the same value as the preceding value in step S100. Thereafter, the process goes to step S109.

If FKNOCKP is equal to "0" in step S98, then it is determined whether a knocking flag FKNOCK is "1" in step S101. If FKNOCK is equal to "1", indicating that knocking has occurred, the downcount timer TADV is then set to a second predetermined time period TMADVL (e.g., 0.5 second), and started in step S102. Then, an additive term DKIGKNU is set to a predetermined value DKIGKNUS in step S103, and applied to the equation (8) shown below, to update the retarding coefficient KIGKN in the increasing direction in step S104, thereby increasing the retarding correction amount of the ignition timing increase.

$$KIGKN = KIGKN + DKIGKNU \quad (8)$$

After step S104, the process goes to step S109.

If FKNOCK is equal to "0" in step S101, it is determined whether the value of the downcount timer TADV, which is started in step S99 or step S102, is "0" in step S105. If the answer is negative (NO), the retarding coefficient KIGKN is set to the same value as the preceding value in step S106. Thereafter, the process goes to step S109. If the value of the timer TADV becomes "0", the process goes from step S105 to step S107, wherein the timer TADV is set to the first predetermined time period TMADVS and started. Then, the retarding coefficient KIGKN is updated in the decreasing direction in step S108 by the equation (9) shown below. Thereafter, the process goes to step S109. By updating the retarding coefficient KIGKN with the equation (9), the retarding correction amount of the ignition timing is reduced, i.e., the ignition timing is advanced, $$KIGKN = KIGKN - DKIGKND \quad (9)$$

where DKIGKND represents a predetermined subtractive value.

In step S109, a first limit process of the calculated retarding coefficient KIGKN is executed. Specifically, if the retarding coefficient KIGKN exceeds the upper limit value KIGKNLMH calculated in step S91, the retarding coefficient KIGKN is reset to the upper limit value KIGKNLMH. If the retarding coefficient KIGKN is less than the lower limit value KIGKNLML calculated in step S91, the retarding coefficient KIGKN is reset to the lower limit value KIGKNLML.

Figure 17:
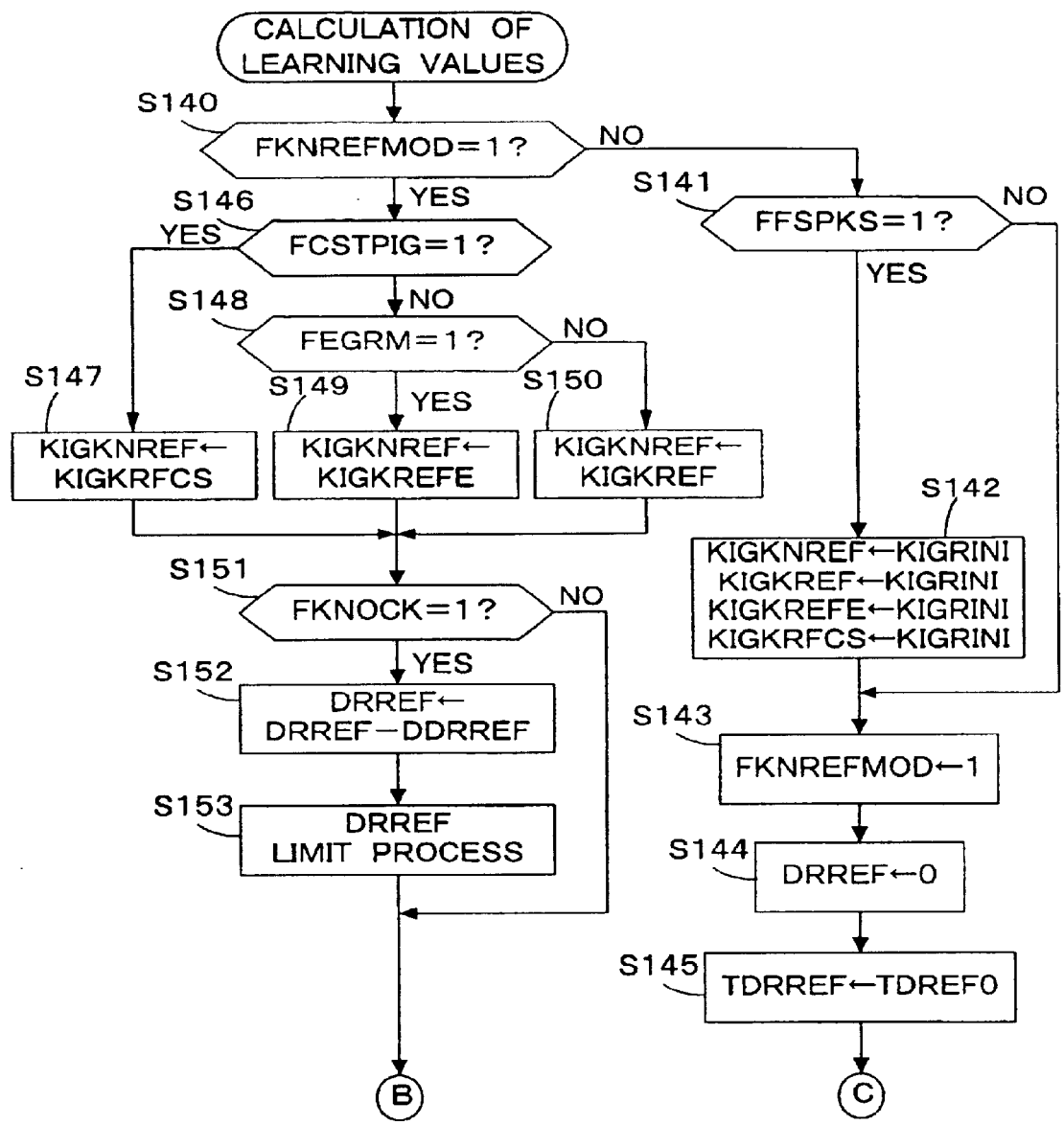
FIGS. 17 and 18 are flowcharts illustrating a learning value calculation process of the retarding coefficient.
Figure 18:
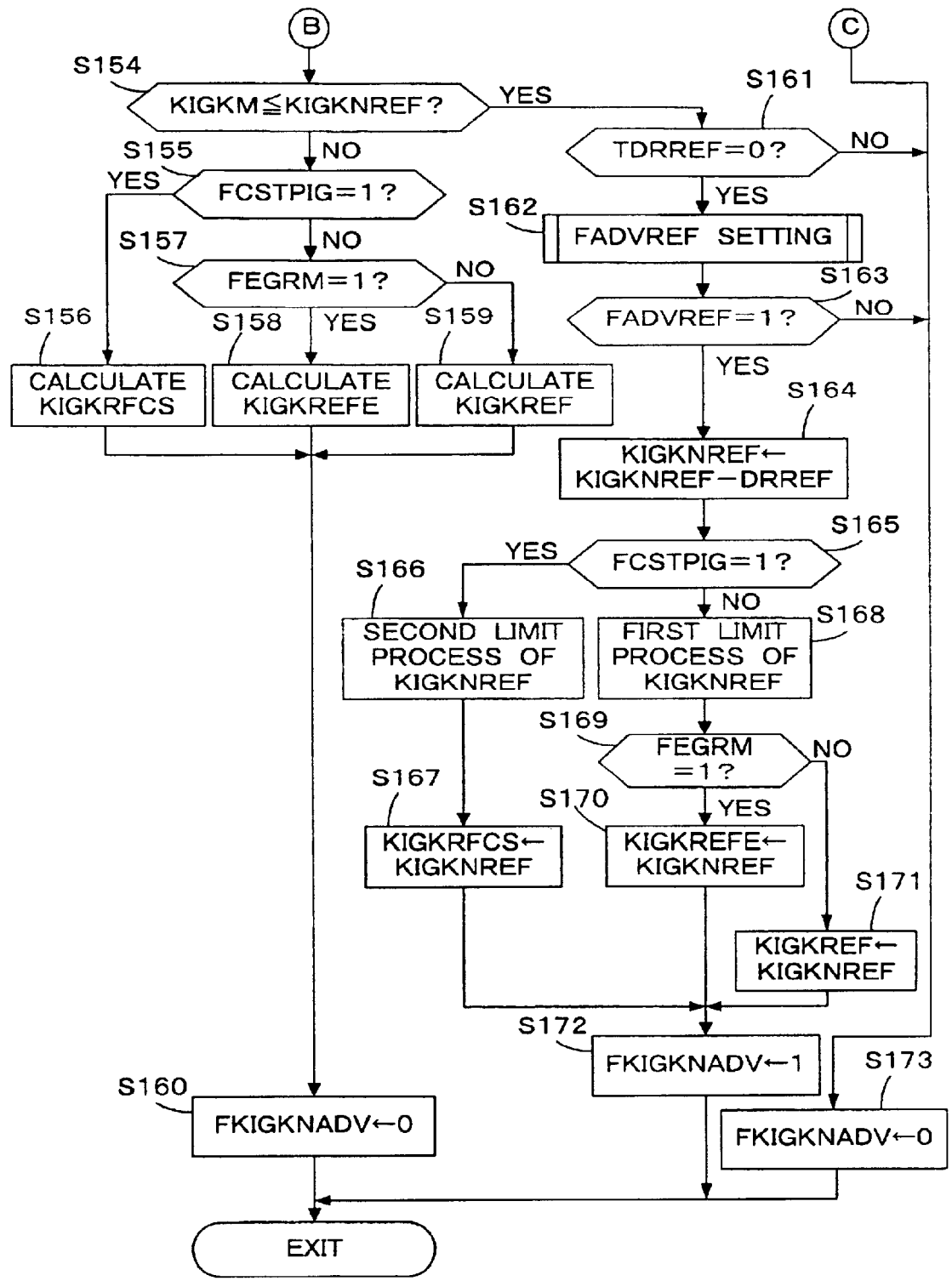

In step S110, a retarding coefficient KIGKM, which calculates a learning value, is set to the calculated retarding coefficient KIGKN. Thereafter, a learning value calculation process illustrated in FIGS. 17 and 18 is executed in step S111. According to the learning value calculation process, a first learning value KIGKREF and a second learning value KIGKREFE are calculated corresponding to all-cylinder operation, and a third learning value KIGKRFCS is calculated corresponding to partial-cylinder operation. The first learning value KIGKREF is a learning value calculated for an operating condition, wherein the exhaust gas recirculation is not performed, and the second learning value KIGKREFE is a learning value calculated for an operating condition, wherein the exhaust gas recirculation is performed.

In step S112, it is determined whether an advance learning flag FKIGKNADV that is set in the learning value calculation process is "1". The advance learning flag FKIGKNADV is set to "1" when the learning value is updated in the advancing direction.

If the answer to step S112 is negative (NO), the retarding coefficient KIGKN is set to the retarding coefficient KIGKM to calculate a learning value in step S113. If FKIGKADV is equal to "1" in step S112, indicating the learning value is updated in the advancing direction, it is determined whether the cylinder halt flag FCSTPIG is "1" in step S114. If FCSTPIG is equal to "1" in step S114, indicating the engine 1 is in partial-cylinder operation, the retarding coefficient KIGKN is set to the third learning value KIGKRFCS in step S115.

If FCSTPIG is equal to "0" in step S114, indicating the engine 1 is in all-cylinder operation, it is determined whether an EGR flag FEGRM is "1" in step S116. The EGR flag FEGRM is set to "1" when the exhaust gas recirculation is performed. If FEGRM is equal to "1", the retarding coefficient KIGKN is set to the second learning value KIGKREFE in step S117. If FEGRM is equal to "0", the retarding coefficient KIGKN is set to the first learning value KIGKREF in step S118.

FIG. 15 is a flowchart of the limit value calculation process that is executed in step S91 illustrated in FIG. 13.

Figure 16:
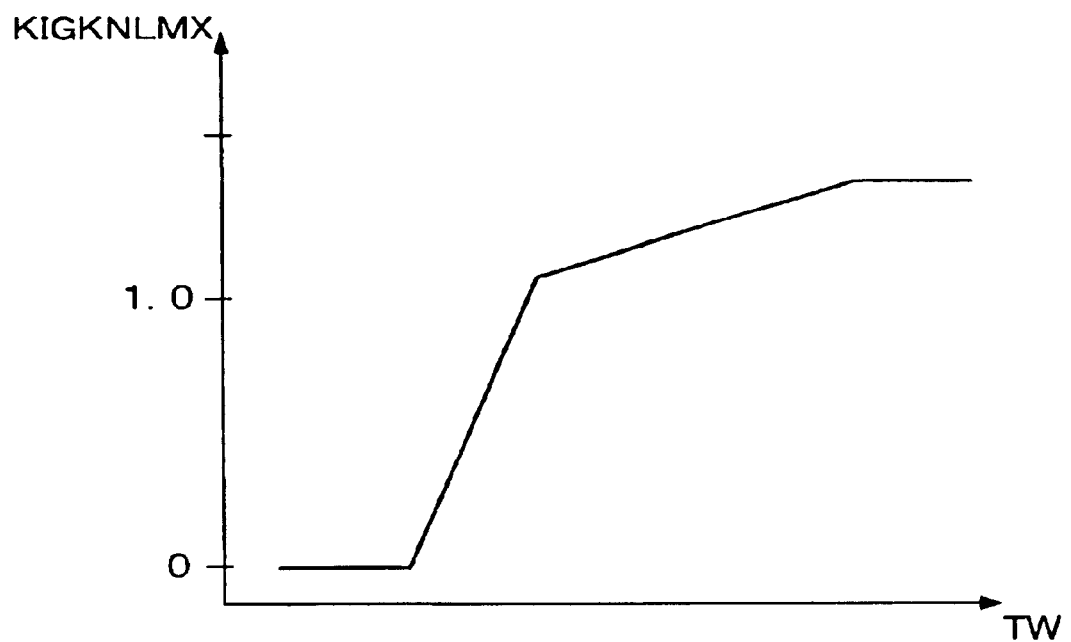
FIG. 16 is a graph chart used in the limit value calculation process of FIG. 15.

In step S121, a KIGKNLMX graph chart illustrated in FIG. 16 is retrieved according to the engine coolant temperature TW to calculate a limit value KIGKNLMX. The KIGKNLMX graph chart is set so the limit value KIGKNLMX increases as the engine coolant temperature TW increases, because knocking does not occur when the engine coolant temperature TW is low, and knocking is liable to occur as the engine coolant temperature TW rises.

In step S122, it is determined whether a control mode flag FKNFB is "1". The control mode flag FKNFB has an initial value of "0". If the answer to step S123 becomes affirmative (YES), the control mode flag FKNFB is set to "1" in step S125. Since FKNFB is initially equal to "0", the process goes to step S123, in which it is determined whether the limit value KIGKNLMX calculated in step S121 is equal to or greater than the first learning value KIGKREF. The answer to step S123 is negative (NO) immediately after the engine has started. Accordingly, the process goes to step S124, in which the lower limit value KIGKNLML is set to the limit value KIGKNLMX. Then, the upper limit value KIGKNLMH is set to the limit value KIGKNLMX in step S133.

If the answer to step S123 becomes affirmative (YES), the control mode flag FKNFB is set to "1" in step S125. Thereafter, the process goes to step S126. After setting the control mode flag FKNFB to "1", the process goes from step S122 to step S126.

In step S126, it is determined whether the cylinder halt flag FCSTPIG is "1". If FCSTPIG is equal to "1", the lower limit value KIGKNLML is set to greater one of the third learning value KIGKRFCS and a predetermined lower limit value KIGKNL in step S127. If FCSTPIG is equal to "0", it is determined whether the EGR flag FEGRM is "1" in step S128. If FEGRM is equal to "1", the lower limit value KIGKNLML is set to the greater one of the second learning value KIGKREFE and the predetermined lower limit value KIGKNL in step S130. If FEGRM is equal to "0", the lower limit value KIGKNLML is set to the greater one of the first learning value KIGKREF and the predetermined lower limit value KIGKNL in step S129.

In step S131, it is determined whether the limit value KIGKNLMX calculated in step S121 is equal to or greater than the lower limit value KIGKNLML. If the answer is affirmative (YES), the process goes to step S133, wherein the upper limit value KIGKNLMH is set to the limit value KIGKNLMX. If the answer to step S131 is negative (NO), the upper limit value KIGKNLMH is made equal to the lower limit value KIGKNLML in step S132.

FIGS. 17 and 18 are flowcharts illustrating the learning value calculation process executed in step S111 of FIG. 14.

In step S140 shown in FIG. 17, it is determined whether an initialization flag FKNREFMOD is "1". Since FKNREFMOD is initially equal to "0", the process goes to step S141, in which it is determined whether the failure detection flag FFSPKS is "1". If the answer is negative (NO), indicating failure is not detected, the process goes to step S143. If FFSPKS is equal to "1", indicating that a failure is detected, an intermediate parameter KIGKNREF for calculating a learning value, the first learning value KIGKREF, the second learning value KIGKREFE, and the third learning value KIGKRFCS are set to a predetermined initialization value KIGRINI in step S142.

In step S143, the initialization flag FKNREFMOD is set to "1". Then, an advancing correction term DRREF is set to "0" in step S144, and a downcount timer TDRREF is set to a predetermined time period TDREF0, e.g., 1.0 second, and started in step S145. Thereafter, the process goes to step S173 in which the advance learning flag FKIGKNADV is set to "0".

After the initialization flag FKNREFMOD is set to "1", the process goes from step S140 to step S146, in which it is determined whether the cylinder halt flag FCSTPIG is "1". If FCSTPIG is equal to "1", indicating the engine 1 is in partial-cylinder operation, the intermediate parameter KIGKNREF is set to the third learning value KIGKRFCS in step S147. If FCSTPIG is equal to "0", indicating that the engine 1 is in all-cylinder operation, it is determined whether the EGR flag FEGRM is "1" in step S148. If FEGRM is equal to "1", indicating exhaust gas recirculation is being performed, the intermediate parameter KIGKNREF is set to the second learning value KIGKREFE in step S149. If FEGRM is equal to "0", indicating exhaust gas recirculation is not being performed, the intermediate parameter KIGKNREF is set to the first learning value KIGKREF in step S150.

In step S151, it is determined whether the knocking flag FKNOCK is "1". If FKNOCK is equal to "1", indicating knocking has occurred, the advancing correction term DRREF is decremented by a predetermined value DDRREF in step S152 by the following equation (10).

$$DRREF=DRREF-DDRREF \quad (10)$$

In step S153, a limit process of the advancing correction term DRREF is performed. Specifically, if the advancing correction term DRREF is less than a predetermined lower limit value DRREFL, the advancing correction term DRREF is reset to the predetermined lower limit value DRREFL. Thereafter, the process goes to step S154.

If FKNOCK is equal to "0" in step S151, indicating knocking does not occur, the process goes to step S154 of FIG. 18.

In step S154, it is determined whether the retarding coefficient KIGKM for calculating a learning value is equal to or less than the intermediate parameter KIGKNREF. If KIGKM is greater than KIGKNREF, indicating the retarding coefficient KIGKM has a value that is retarded from the intermediate parameter KIGKNREF, the retarding coefficient KIGKM is averaged to calculate learning values in steps S155 through S159, and upper limit processes of the calculated learning values are performed. The retarding coefficient KIGKM is subjected to the limit process in step S109 of FIG. 13. However, since upper limit values of the learning values may be set separately, the limit processes of the learning values are performed again.

In step S155, it is determined whether the cylinder halt flag FCSTPIG is "1". If FCSTPIG is equal to "1", indicating the engine 1 is in partial-cylinder operation, the retarding coefficient KIGKM is applied to the equation (11) shown below to calculate the third learning value KIGKRFCS in step S156. If the calculated third learning value KIGKRFCS exceeds a predetermined upper limit value KIGREFH, the third learning value KIGKRFCS is reset to the upper limit value KIGREFH.

$$KIGKRFCS=CKIGREF \times KIGKM+(1-CKIGREF) \times KIGKRFCS \quad (11)$$

where CKIGREF represents an average coefficient set to a value in the range from "0" to "1", and KIGKRFCS on the right side of the equation represents the latest past value of the third learning value.

If FCSTPIG is equal to "0" in step S155, indicating the engine 1 is in all-cylinder operation, it is determined whether the EGR flag FEGRM is "1" in step S157. If FEGRM is equal to "1", indicating exhaust gas recirculation is being performed, the second learning value KIGKREFE is calculated by the equation (12) shown below in step S158. If the calculated second learning value KIGKREFE exceeds the predetermined upper limit value KIGREFH, the second learning value KIGKREFE is reset to the upper limit value KIGREFH.

$$KIGKREFE=CKIGREF \times KIGKM+(1-CKIGREF) \times KIGKREFE \quad (12)$$

where KIGKREFE on the right side of the equation represents the latest past value of the second learning value.

If FEGRM is equal to "0", indicating exhaust gas recirculation is not being performed, the first learning value KIGKREF is calculated by the equation (13) shown below in step S159. If the calculated first learning value KIGKREF exceeds the predetermined upper limit value KIGREFH, the first learning value KIGKREF is reset to the upper limit value KIGREFH.

$$KIGKREF=CKIGREF \times KIGKM+(1-CKIGREF) \times KIGKREF \quad (13)$$

where KIGKREF on the right side of the equation represents the latest past value of the first learning value.

In step S160, the advance learning flag FKIGKNADV is set to "0". Thereafter, the process ends.

If KIGKM is less than or equal to KIGKNREF in step S154, indicating the retarding coefficient KIGKM has a value advanced from the intermediate parameter KIGKNREF, it is determined whether the value of the downcount timer TDRREF, which is started in step S145, is "0" in step S161. If TDRREF is greater than "0", the process goes to step S173. If TDRREF is equal to "0", a FADVREF setting process illustrated in FIG. 19 is executed in step S162.

Figure 19:
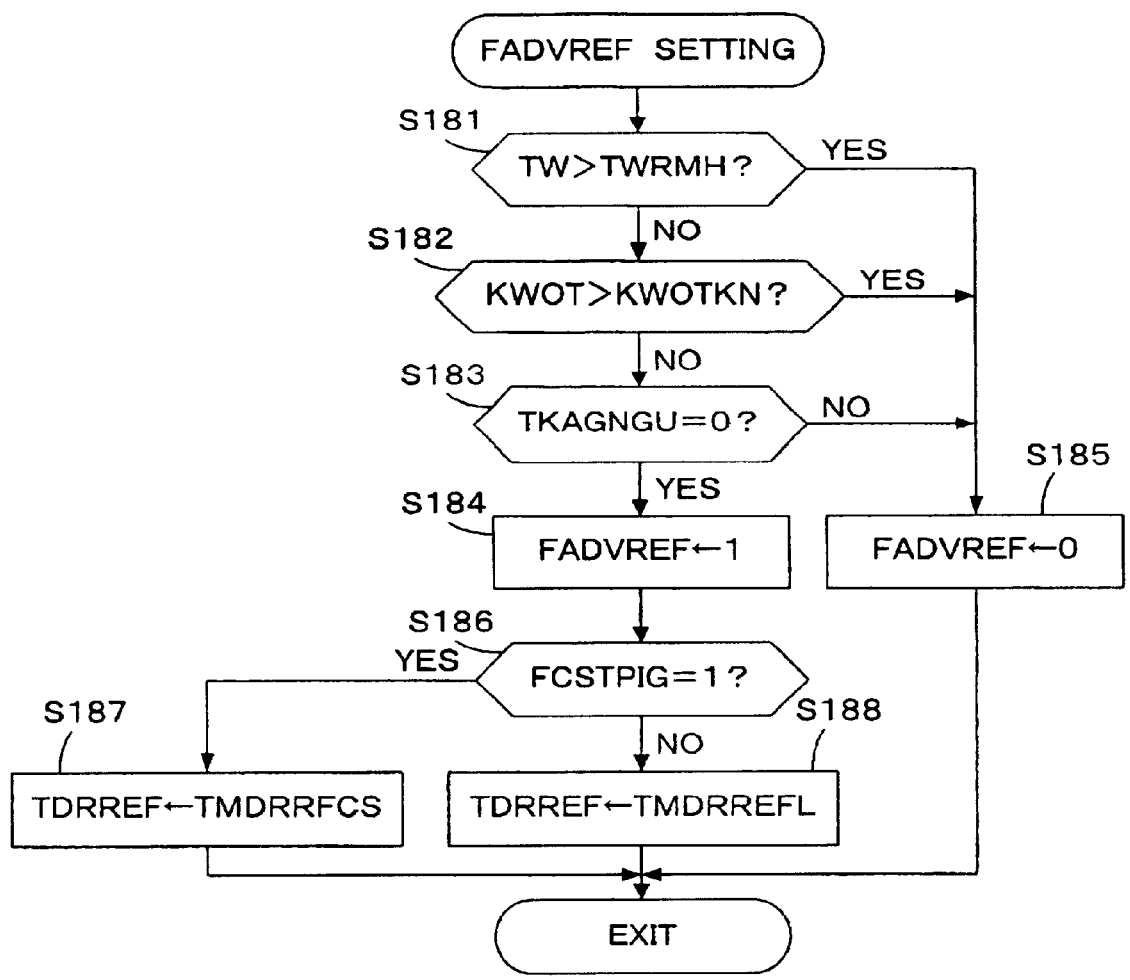
FIG. 19 is a flowchart illustrating a flag (FADVREF) setting process.

In step S181 of FIG. 19, it is determined whether the engine coolant temperature TW is higher than a predetermined coolant temperature TWRMH (e.g., 120° C.). If TW is lower than or equal to TWRMH, then it is determined whether a high-load correction coefficient KWOT of the fuel injection amount is greater than a predetermined coefficient value KWOTKN (e.g., 1.438). The high-load correction coefficient KWOT is set to a value greater than "1.0" in a wide-open-throttle engine operating condition, wherein the throttle valve is almost fully opened, and set to "1.0" in other engine operating conditions.

If the answer to step S182 is negative (NO), i.e., if the engine is not in the wide-open-throttle engine operating condition, it is determined whether the value of a downcount timer TKAGNGU is "0" in step S183. The downcount timer TKAGNGU is set to a predetermined time period TFCD, e.g., 0.5 second, at the time the fuel-cut operation, wherein the fuel supply to the engine is stopped, is finished, i.e., at the time the fuel supply is restarted. If TKAGNGU is equal to "0", and the predetermined time period TFCD has elapsed after the end of the fuel-cut operation, the process goes to step S184 to set an advance learning permission flag FADVREF to "1".

Then, it is determined whether the cylinder halt flag FCSTPIG is "1" in step S186. If FCSTPIG is equal to "1", indicating the engine 1 is in partial-cylinder operation, the downcount timer TDRREF is set to a predetermined time period TMDRRFCS, e.g., 1.0 second, for partial-cylinder operation and started in step S187. If FCSTPIG is equal to "0", indicating the engine 1 is in all-cylinder operation, the downcount timer TDRREF is set to a predetermined time period TMDRRERL, e.g., 0.4 to 1.0 second, for all-cylinder operation and started in step S188.

If the answer to step S181 or S182 is affirmative (YES), or if the answer to step S183 is negative (NO), the process goes to step S185 in which the advance learning permission flag FADVREF is set to "0" to inhibit the learning value from being updated in the advancing direction. This is because it is not preferable to update the learning value in the advancing direction in the engine operating condition that is largely different from the normal engine operating condition.

Referring back to FIG. 18, in step S163, it is determined whether the advance learning permission flag FADVREF is "1". If FADVREF is equal to "0", indicating the learning value is inhibited from updating in the advancing direction, the process goes to step S173 without updating the learning value.

If FADVREF is equal to "1", indicating it is permitted to update the learning value in the advancing direction, the intermediate parameter KIGKNREF is decremented by the advancing correction term DRREF by the equation (14) shown below. The intermediate parameter KIGKNREF is updated in the advancing direction.

$$KIGKNREF = KIGKNREF - DRREF \quad (14)$$

In step S165, it is determined whether the cylinder halt flag FCSTPIG is "1". If FCSTPIG is equal to "0", indicating the engine 1 is in all-cylinder operation, a first limit process of the intermediate parameter KIGKNREF is performed in step S168. Specifically, if the intermediate parameter KIGKNREF is less than a predetermined lower limit value KIGREFL, the intermediate parameter KIGKNREF is reset to the predetermined lower limit value KIGREFL.

Then, it is determined whether the EGR flag FEGRM is "1" in step S169. If FEGRM is equal to "1", indicating exhaust gas recirculation is being performed, the second learning value KIGKREFE is set to the intermediate parameter KIGKNREF in step S170. Thereafter, the process goes to step S172. If FEGRM is equal to "0", indicating exhaust gas recirculation is not being performed, the first learning value KIGKREF is set to the intermediate parameter KIGKNREF in step S171. Thereafter, the process goes to step S172.

If FCSTPIG is equal to "1" in step S165, indicating the engine 1 is in partial-cylinder operation, a second limit process of the intermediate parameter KIGKNREF is performed in step S166. Specifically, if the intermediate parameter KIGKNREF is less than a predetermined lower limit value KIGRFCL, the intermediate parameter KIGKNREF is reset to the predetermined lower limit value KIGRFCL.

In step S167, the third learning value KIGKRFCS is set to the intermediate parameter KIGKNREF. Thereafter, the process goes to step S172.

In step S172, the advance learning flag FKIGKNADV is set to "1".

According to the process illustrated in FIGS. 17 and 18, the first learning value KIGKREF or the second learning value KIGKREFE is calculated when the engine 1 is in all-cylinder operation, and the third learning value KIGKRFCS is calculated when the engine 1 is in partial-cylinder operation. Therefore, the learning values of the retarding coefficient suitable for the respective engine operating conditions are obtained. For example, when the engine operating condition changes from partial-cylinder operation to all-cylinder operation or vice versa, and the learning value KIGKREF, KIGKREFE, or KIGKRFCS is updated in the advancing direction, the learning value suitable for the changed engine operating condition is applied as the retarding coefficient KIGKN (see FIG. 14, steps S114 through S118). As a result, even immediately after such a change in the engine operating condition, a sufficient engine output can be obtained while suppressing knocking.

In the present embodiment, the analog circuit section 51, the sub-microcomputer 52, and the main microcomputer 53 of the ECU 5 define a knocking determining means, and the main microcomputer 53 defines a correcting means and a learning value calculating means. Specifically, the process of FIG. 5 corresponds to a part of the knocking determining means. The process of FIG. 12 corresponds to the correcting means, and the process of FIGS. 17 and 18 corresponds to the learning value calculating means.

The present invention is not limited to the above embodiment and various modifications may be made without departing from the scope of the invention. For example, in the above embodiment, the learning values, i.e., KIGKRFCS, KIGKREF, KIGKREFE, of the retarding coefficient KIGKN are calculated. However, the learning values, i.e., DIGKR×KIGKRFCS, DIGKR×KIGKREF, DIGKR×KIGKREFE, of the knock correction term IGKNOCK may be calculated corresponding respectively to partial-cylinder operation and all-cylinder operation.

The present invention is also applicable to an ignition timing control for a watercraft propulsion engine, such as, for example only, an outboard motor having a vertically extending crankshaft.

The present invention may be embodied in other specific forms without departing from the spirit or essential characteristics thereof. The presently disclosed embodiments are therefore to be considered in all respects as illustrative and not restrictive, the scope of the invention being indicated by the appended claims, rather than the foregoing description, and all changes which come within the meaning and range of equivalency of the claims are, therefore, to be embraced therein.

What is claimed is:

1. An ignition timing control apparatus for an internal combustion engine having a plurality of cylinders, operation of said engine being switchable between partial-cylinder operation, which operates some of the cylinders, and all-cylinder operation, which operates all of the cylinders, said ignition timing control apparatus comprising:

basic ignition timing calculating means for calculating a basic ignition timing according to an operating condition of said engine;

a knock sensor mounted on said engine;

knocking determining means for determining whether knocking has occurred based on an output of said knock sensor;

correcting means for calculating a correction amount according to a determined result from said knocking determining means to suppress knocking, and correcting the basic ignition timing using the calculated correction amount; and learning value calculating means for calculating learning values of the correction amount calculated by said correcting means, wherein said learning value calculating means calculates the learning values corresponding, respectively, to the partial-cylinder operation and the all-cylinder operation, and wherein said correcting means uses one of the learning values calculated by said learning value calculating means, according to the operating condition of said engine.

2. The ignition timing control apparatus according to claim 1, wherein during all-cylinder operation, said learning value calculating means calculates a first learning value to be applied in the operating condition of said engine where an exhaust gas recirculation is being performed, when the exhaust gas recirculation is being performed, and calculates a second learning value to be applied in the operating condition of said engine where the exhaust gas recirculation is not being performed, when the exhaust gas recirculation is not being performed.

3. The ignition timing control apparatus according to claim 1, wherein said basic ignition timing calculating means calculates the basic ignition timing according to a number of operating cylinders.

4. The ignition timing control apparatus according to claim 1, wherein said correcting means uses one of the learning values as the correction amount when the learning value is updated by said learning value calculating means to advance the ignition timing.

5. The ignition timing control apparatus according to claim 1, wherein said correcting means includes limit value calculating means for calculating a limit value of the correction amount using the learning values corresponding, respectively, to the partial-cylinder operation and the all-cylinder operation, and limiting means for limiting the correction amount using the limit value calculated by said limit value calculating means.

6. The ignition timing control apparatus according to claim 1, wherein said knocking determining means includes noise level calculating means for calculating a noise level based on the output of said knock sensor, gain coefficient calculating means for calculating a gain coefficient according to a number of operating cylinders, and determination threshold calculating means for calculating a determination threshold by multiplying the noise level by the gain coefficient, wherein said knocking determining means determines knocking has occurred when a maximum value of the output of said knocking sensor exceeds the determination threshold.

7. An ignition timing control method for an internal combustion engine having a plurality of cylinders, operation of said engine being switchable between partial-cylinder operation, which operates some of the cylinders, and all-cylinder operation, which operates all of the cylinders, said ignition timing control method comprising the steps of:

a) calculating a basic ignition timing according to an operating condition of said engine;

b) determining whether knocking has occurred based on an output of a knock sensor mounted on said engine;

c) calculating a correction amount according to a determined result in said step b) to suppress knocking;

d) correcting the basic ignition timing with the calculated correction amount; and e) calculating learning values of the calculated correction amount, wherein the learning values are calculated corresponding, respectively, to the partial-cylinder operation and the all-cylinder operation, and one of the calculated learning values is used for the correction in said step d) according to the operating condition of said engine.

8. The ignition timing control method according to claim 7, wherein during all-cylinder operation, a first learning value to be applied in an operating condition where an exhaust gas recirculation is performed is calculated when the exhaust gas recirculation is being performed, and a second learning value to be applied in an operating condition where the exhaust gas recirculation is not performed is calculated when the exhaust gas recirculation is not being performed.

9. The ignition timing control method according to claim 7, wherein the basic ignition timing is calculated according to a number of operating cylinders.

10. The ignition timing control method according to claim 7, wherein one of the learning values is used as the correction amount when the learning value is updated to advance the ignition timing.

11. The ignition timing control method according to claim 7, wherein said step c) of calculating the correction amount includes the steps of:

c1) calculating a limit value of the correction amount, using learning values corresponding, respectively, to the partial-cylinder operation and the all-cylinder operation; and c2) limiting the correction amount using the calculated limit value.

12. The ignition timing control method according to claim 7, wherein said step b) includes the steps of:

b1) calculating a noise level based on the output of said knock sensor;

b2) calculating a gain coefficient according to a number of operating cylinders; and b3) calculating a determination threshold by multiplying the noise level by the gain coefficient, wherein it is determined knocking has occurred when a maximum value of the output of said knocking sensor exceeds the determination threshold.

13. The computer program according to claim 7, wherein said step b) includes the steps of:

b1) calculating a noise level based on the output of said knock sensor;

b2) calculating a gain coefficient according to a number of operating cylinders; and b3) calculating a determination threshold by multiplying the noise level by the gain coefficient, wherein it is determined knocking has occurred when a maximum value of the output of said knocking sensor exceeds the determination threshold.

14. A computer program for causing a computer to carry out an ignition timing control method for an internal combustion engine having a plurality of cylinders, operation of said engine being switchable between partial-cylinder operation, which operates some of the cylinders, and all-cylinder operation, which operates all of the cylinders, said ignition timing control method comprising the steps of:

a) calculating a basic ignition timing according to an operating condition of said engine;

b) determining whether knocking has occurred based on an output of a knock sensor mounted on said engine;

c) calculating a correction amount according to a determined result in said step b) to suppress knocking;

d) correcting the basic ignition timing with the calculated correction amount; and e) calculating learning values of the calculated correction amount, wherein the learning values are calculated corresponding, respectively, to the partial-cylinder operation and the all-cylinder operation, and one of the calculated learning values is used for the correction in said step d) according to the operating condition of said engine.

15. The computer program according to claim 14, wherein during all-cylinder operation, a first learning value to be applied in an operating condition where an exhaust gas recirculation is performed is calculated when the exhaust gas recirculation is being performed, and a second learning value to be applied in an operating condition where the exhaust gas recirculation is not performed is calculated when the exhaust gas recirculation is not being performed.

16. The computer program according to claim 14, wherein the basic ignition timing is calculated according to a number of operating cylinders.

17. The computer program according to claim 14, wherein one of the learning values is used as the correction amount when the learning value is updated to advance the ignition timing.

18. The computer program according to claim 14, wherein said step c) of calculating the correction amount includes the steps of:

c1) calculating a limit value of the correction amount, using learning values corresponding, respectively, to the partial-cylinder operation and the all-cylinder operation; and c2) limiting the correction amount using the calculated limit value.

* * * * *